(12) United States Patent
Kobayashi et al.

(10) Patent No.: US 12,043,722 B2
(45) Date of Patent: Jul. 23, 2024

(54) ELECTROCONDUCTIVE PASTE

(71) Applicant: SEKISUI CHEMICAL CO., LTD., Osaka (JP)

(72) Inventors: Hiroko Kobayashi, Shiga (JP); Kazuto Nakamura, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 111 days.

(21) Appl. No.: 17/762,832

(22) PCT Filed: Sep. 25, 2020

(86) PCT No.: PCT/JP2020/036378
§ 371 (c)(1),
(2) Date: Mar. 23, 2022

(87) PCT Pub. No.: WO2021/060502
PCT Pub. Date: Apr. 1, 2021

(65) Prior Publication Data
US 2022/0340732 A1    Oct. 27, 2022

(30) Foreign Application Priority Data

Sep. 27, 2019  (JP) .................................. 2019-177565

(51) Int. Cl.
*C08K 3/08* (2006.01)
*C08F 118/08* (2006.01)
(Continued)

(52) U.S. Cl.
CPC .............. *C08K 3/08* (2013.01); *C08F 118/08* (2013.01); *C08K 3/24* (2013.01); *C08K 5/05* (2013.01);
(Continued)

(58) Field of Classification Search
CPC ... C08K 3/08; C08K 3/24; C08K 5/05; C08K 2003/0862; C08K 2201/001;
(Continued)

(56) References Cited

U.S. PATENT DOCUMENTS

2014/0334071 A1* 11/2014 Endo ..................... H01G 9/042
                                                                252/500
2016/0311199 A1  10/2016 Iwamoto et al.
2017/0037271 A1   2/2017 Kobayashi et al.

FOREIGN PATENT DOCUMENTS

CN    105658595    6/2016
JP    9-105679     4/1997
(Continued)

OTHER PUBLICATIONS

International Search Report issued Dec. 15, 2020 in corresponding International (PCT) Patent Application No. PCT/JP2020/036378.

*Primary Examiner* — Mark Kopec
*Assistant Examiner* — Jaison P Thomas
(74) *Attorney, Agent, or Firm* — Wenderoth, Lind & Ponack, L.L.P.

(57) ABSTRACT

The present invention provides a conductive paste which leaves less fine undissolved matter when dissolved in an organic solvent and thus can be easily filtrated, which has excellent printability, and which can exhibit excellent surface smoothness after printing. Provided is a conductive paste used for forming an electrode of a multilayer ceramic capacitor, the conductive paste containing: a polyvinyl acetal resin; an organic solvent; and a conductive powder, the polyvinyl acetal resin having a wave number A ($cm^{-1}$) of a peak within a range of 3,100 to 3,700 $cm^{-1}$ in an IR absorption spectrum measured using an infrared spectrophotometer; and a hydroxy group content (mol %), the wavenumber A of the peak and the hydroxy group content satisfying relations of the following formulas (1) and (2):

(Continued)

$$[(3{,}470-A)/\text{Hydroxy group content}] \leq 5.0 \quad (1)$$

$$(3{,}470-A) \leq 150 \quad (2)$$

wherein A is a wavenumber which is lower than 3,470 cm$^{-1}$ and at which a transmittance a (%) satisfying [100−(100−X)/2] is exhibited, where X (%) is s minimum transmittance of the peak within the wavenumber range of 3,100 to 3,700 cm$^{-1}$.

8 Claims, 3 Drawing Sheets

(51) Int. Cl.
*C08K 3/24* (2006.01)
*C08K 5/05* (2006.01)
*H01B 1/22* (2006.01)
*H01G 4/008* (2006.01)
*H01G 4/12* (2006.01)
*H01G 4/30* (2006.01)

(52) U.S. Cl.
CPC ............... *H01B 1/22* (2013.01); *H01G 4/008* (2013.01); *H01G 4/12* (2013.01); *H01G 4/30* (2013.01); *C08K 2003/0862* (2013.01); *C08K 2201/001* (2013.01); *C08K 2201/014* (2013.01)

(58) Field of Classification Search
CPC ...... C08K 2201/014; C08K 2003/2237; C08K 3/22; C08F 118/08; C08F 8/28; H01B 1/22; H01G 4/008; H01G 4/12; H01G 4/30; H01G 4/0085; C09D 5/24; C09D 11/106; C09D 11/52; C08L 29/14
See application file for complete search history.

(56) References Cited

FOREIGN PATENT DOCUMENTS

| | | |
|---|---|---|
| JP | 2005-325342 | 11/2005 |
| JP | 2010-118470 | 5/2010 |
| JP | 2012-216488 | 11/2012 |
| JP | 2013-187022 | 9/2013 |
| JP | 2015-67707 | 4/2015 |
| JP | 2017-63196 | 3/2017 |
| JP | 2017-228780 | 12/2017 |
| TW | 201541469 | 11/2015 |
| WO | 2015/141623 | 9/2015 |

* cited by examiner

ELECTROCONDUCTIVE PASTE

TECHNICAL FIELD

The present invention relates to a conductive paste which leaves less fine undissolved matter when dissolved in an organic solvent and thus can be easily filtrated, which has excellent profitability, and which can exhibit excellent surface smoothness after printing.

BACKGROUND ART

Recent electronic components installed in various electronic devices have become increasingly smaller and multilayered. Multilayer electronic components, such as multilayer circuit boards, multilayer coils, and multilayer ceramic capacitors, have been widely used.

Multilayer ceramic capacitors are typically produced through the following steps.

First, a plasticizer, a dispersant, and the like are added to a solution of a binder resin such as a polyvinyl butyral resin or a poly(meth)acrylate resin in an organic solvent. Ceramic raw material powder is then added and uniformly mixed in a mixer such as a bead mill or a ball mill and deaerated, whereby a ceramic slurry composition having a specific viscosity is obtained. This slurry composition is cast on a surface of a support such as a release-treated polyethylene terephthalate film or a SUS plate using a doctor blade, a reverse roll coater, or the like. The slurry composition is subjected to heating or the like to remove the organic solvent and other volatile components, and then separated from the support to give a ceramic green sheet.

Next, the obtained ceramic green sheet is screen-printed with a conductive paste that is to serve as an internal electrode. Sheets obtained in this manner are stacked such that the ceramic green sheets and the conductive paste layers alternate with each other, and thermally pressure-bonded to produce a laminate. The obtained laminate is subjected to a treatment called debinding, that is, a treatment to remove components such as the binder resin component in the laminate by heat decomposition. The laminate is then fired to produce a ceramic sintered body, and external electrodes are sintered to the end surfaces of the ceramic sintered body. Through these steps, a multilayer ceramic capacitor is obtained.

Polyvinyl acetal resins used for preparing conductive pastes are typically used as solutions in organic solvents such as alcohols, esters, ethers, hydrocarbons, and mixtures of these. However, conventional polyvinyl acetal resins may leave trace amounts of undissolved matter when dissolved in organic solvents. Such undissolved matter present in solutions used in conductive pastes tends to cause voids in the debinding step and the firing step, or lowers the dispersibility of conductive powder and the like, thus lowering the electrical characteristics of the resulting products.

Thus, using a polyvinyl acetal resin in a multilayer ceramic capacitor application requires removal of undissolved matter by a filtration step after mixing the polyvinyl acetal resin with organic/inorganic compounds and the like and dissolving them in an organic solvent.

In response to this, Patent Literature 1 proposes a polyvinyl acetal resin, wherein the rate of decrease in filtration flow rate is lower than 10% when a 5% by weight solution of the polyvinyl acetal resin in a 1:1 solvent mixture of methyl ethyl ketone and/or toluene and ethanol is filtrated using a 5-μm-aperture filter at a filtration temperature of 25° C. and a filtration pressure of 10 mmHg. Patent Literature 1 also teaches that using such a polyvinyl acetal resin can improve productivity because such a resin leaves less undissolved matter when dissolved in an organic solvent and thus can shorten the filtration time.

CITATION LIST

Patent Literature

Patent Literature 1: JP 2005-325342 A

SUMMARY OF INVENTION

Technical Problem

Meanwhile, with the recent increase in functionality and reduction in size of electronic devices, multilayer ceramic capacitors having smaller size and greater capacity have been demanded. To meet such a demand, finer undissolved matter must be sufficiently removed. However, even the polyvinyl acetal resin disclosed in Patent Literature 1 may leave finer undissolved matter that cannot be sufficiently removed, and may require filtration or the like to remove the undissolved matter, lowering productivity.

The present invention aims to provide a conductive paste which leaves less fine undissolved matter when dissolved in an organic solvent and thus can be easily filtrated, which has excellent printability, and which can exhibit excellent surface smoothness after printing.

Solution to Problem

The present invention relates to a conductive paste used for forming an electrode of a multilayer ceramic capacitor, the conductive paste containing: a polyvinyl acetal resin; an organic solvent; and a conductive powder, the polyvinyl acetal resin having: a wavenumber A ($cm^{-1}$) of a peak within a range of 3,100 to 3,700 $cm^{-1}$ in an IR absorption spectrum measured using an infrared spectrophotometer; and a hydroxy group content (mol %), the wavenumber A of the peak and the hydroxy group content satisfying relations of the following formulas (1) and (2):

$$[(3{,}470-A)/\text{Hydroxy group content}] \leq 5.0 \quad (1)$$

$$(3{,}470-A) \leq 150 \quad (2)$$

wherein A is a wavenumber which is lower than 3,470 $cm^{-1}$ and at which a transmittance a (%) satisfying [100−(100−X)/2] is exhibited, where X (%) is a minimum transmittance of the peak within the wavenumber range of 3,100 to 3,700 $cm^{-1}$.

The present invention is described in detail below.

The present inventors made intensive studies to find out the following: a polyvinyl acetal resin in which a wavenumber A of a peak, at which the transmittance satisfies a predetermined relation with the minimum transmittance, and the hydroxy group content satisfy a specific relation leaves less undissolved matter when dissolved in an organic solvent, and can improve productivity particularly when used as a binder for a conductive paste for forming an electrode of a multilayer ceramic capacitor. The inventors also found out that, using such a polyvinyl acetal resin as a binder resin for a conductive paste can provide high printability and coating film strength. The inventors thus completed the present invention.

The conductive paste at the present invention contains a polyvinyl acetal resin.

FIG. 1 shows an exemplary IR absorption spectrum of the polyvinyl acetal resin according to the present invention measured at 20° C. using an infrared spectrophotometer. FIG. 1 shows the transmittance on the vertical axis and the wavenumber on the horizontal axis.

In the IR absorption spectrum shown in FIG. 1, the minimum transmittance X is 64.5%. The transmittance a satisfying [100−(100−X)/2] is 82.25%. The wavenumber A of the peak which is lower than 3,470 cm$^{-1}$ and at which the transmittance a is exhibited is 3,325 cm$^{-1}$. The wavenumber B of the peak which is higher than 3,470 cm$^{-1}$ and at which the transmittance a is exhibited is 3,555 cm$^{-1}$.

In the above case, (3,470−A) is 145 (cm$^{-1}$). For example, when the hydroxy group content is 30 mol %, [(3,470−A)/Hydroxy group content] is 4.83 (cm$^{-1}$/mol %). (B−3.470) is 85 (cm$^{-1}$), and (3,470−A)/(B−3,470) is 1.70.

FIG. 2 shows another exemplary embodiment of an IR absorption spectrum of the polyvinyl acetal resin according to the present invention measured at 20° C. using an infrared spectrophotometer.

In the IR absorption spectrum shown in FIG. 2, the minimum transmittance X is 74%. The transmittance a satisfying [100−(100−X)/2] is 87%. The wavenumber A of the peak which is lower than 3,470 cm$^{-1}$ and at which the transmittance a is exhibited is 3,390 cm$^{-1}$. The wavenumber B of the peak which is higher than 3,470 cm$^{-1}$ and at which the transmittance a is exhibited is 3,570 cm$^{-1}$.

In the above case, (3,470−A) is 80 (cm$^{-1}$). For example, when the hydroxy group content is 22 mol %, [(3,470−A)/Hydroxy group content] is 3.64 (cm$^{-1}$/mol %). (B−3.470) is 100 (cm$^{-1}$), and (3,470−A)/(B−3,470) is 0.80.

The IR absorption spectrum can be measured using, for example, a Fourier transform infrared spectrophotometer (e.g., "FT-720" produced by HORIBA, "FT/IR-4000" produced by JASCO Corporation) at 20° C. by the transmission method.

In the analysis of the polyvinyl acetal resin using an infrared spectrophotometer, a spectrum appears near 2,980 cm$^{-1}$ which is derived from the stretching vibrations of the C—H bond of the polyvinyl acetal resin. The peak analysis first involves adjusting the thickness of the measurement sample such that the peak derived from the stretching vibrations of the C—H bond, with a baseline connecting 2,500 cm$^{-1}$ and 3,050 cm$^{-1}$, has a minimum transmittance of 20 to 30%, and then performing measurement. In the measurement results, a baseline is drawn for the peak appearing within the wavenumber range of 3,100 to 3,700 cm$^{-1}$, and correction is performed to adjust the transmittance at both ends of the peak to 100%. The corrected data is then analyzed.

In the polyvinyl acetal resin, the wave number A (cm$^{-1}$) of the peak within wavenumber range of 3,100 to 3,700 cm$^{-1}$ and the hydroxy group content (mol %) satisfy the relation of the following formula (1).

$$[(3{,}470{-}A)/\text{Hydroxy group content}] \le 5.0 \quad (1)$$

Satisfying the relation makes it possible to reduce fine undissolved matter.

The [(3,470−A)/Hydroxy group content] is preferably 4.5 cm$^{-1}$/mol % or smaller. The lower limit thereof is not limited, and is preferably 2.5 cm$^{-1}$/mol % or greater.

In the polyvinyl acetal resin, the wavenumber A (cm$^{-1}$) of the peak within the wavenumber range of 3,100 to 3.700 cm$^{-1}$ satisfies the relation of the following formula (2).

$$(3{,}470{-}A) \le 150 \quad (2)$$

A greater difference between the wavenumber 3,470 cm$^{-1}$ and the wavenumber A (cm$^{-1}$) of the peak (3,470−A) suggests that a larger number of associated OH groups exist, A portion with many associated OH groups has high polarity, and thus is less soluble in an organic solvent.

The upper limit of the (3,470−A) is preferably 120 cm$^{-1}$. The lower limit of the difference is not limited, and is preferably as small as possible. The lower limit is preferably 0 cm$^{-1}$.

The minimum transmittance X (%) is derived from the hydroxy group content of the polyvinyl acetal resin. The hydroxy group content is preferably 16 to 25 mol % for the reason described later. The lower limit of the minimum transmittance X is thus preferably 53%, more preferably 58% and the upper limit thereof is preferably 85%, more preferably 83%.

A smaller wavenumber B of the peak suggests that a larger number of associated OH groups exist. A portion with many associated OH groups has high polarity, and thus is less soluble in an organic solvent. The lower limit of the wave number B (cm$^{-1}$) of the peak is thus preferably 3,520 cm$^{-1}$, more preferably 3,540 cm$^{-1}$. The upper limit thereof is not limited and is preferably as great as possible. Considering the principle of IR spectra, the upper limit is presumably 3,800 cm$^{-1}$.

The wavenumber A of the peak and the wavenumber B of the peak, preferably satisfy a relation of the following formula (3) so that the number of associated OH groups is not too large.

$$(3{,}470{-}A)/(B{-}3{,}470) \le 1.4 \quad (3)$$

B is a wavenumber which is higher than 3,470 cm$^{-1}$ and at which the transmittance a (%) satisfying [100−(100−X)/2] is exhibited, where X (%) is the minimum transmittance of the peak within the wavenumber range of 3,100 to 3,700 cm$^{-1}$ The lower limit of the (3,470−A)/(B−3,470) is preferably 0.5, and the upper limit thereof is more preferably 1.1.

The wavenumber A of the peak and the wavenumber B of the peak can be adjusted by, for example, appropriately setting the crystallinity, the degree of saponification, and the degree of polymerization of a raw material polyvinyl alcohol resin; acetalization reaction conditions such as reaction time and reaction temperature; and the acetal group content, the hydroxy group content, the crystallinity, and the Mw/Hn of the polyvinyl acetal resin.

Preferably, a solution of the polyvinyl acetal resin at a concentration of 0.2% by weight in dihydroterpineol acetate has a percentage of particles having a diameter of 0.5 to 1.0 μm of 2.5×1.0$^{-8}$% by volume or lower relative to 100% by volume of the resin solution when a particle size distribution, of the resin solution is determined using a particle counter. The number of particles having a diameter of 0.5 to 1.0 μm is measured using a particle counter. The volume of the particles having a diameter of 0.5 to 1.0 μm is calculated assuming that they are true spheres having a diameter of 0.75 μm. Based on the number of particles and the volume, the percentage (% by volume) of particles having a diameter of 0.5 to 1.0 μm is calculated.

When the percentage is 2.5×10$^{-8}$% by volume or lower, the filtration time can be shortened. In addition, the conductive paste can be more uniform and can form a smoother coating film. This reduces sheet defects such as cracks, thus reducing the occurrence of breakdown. In other words, advantageously, a more reliable multilayer ceramic capacitor can be obtained.

The percentage is more preferably $2.1 \times 10^{-8}$% by volume or lower. The lower limit of the percentage is not limited, and is preferably as small as possible. The lower limit is preferably 0% by volume.

The particle counter may be "KS-42C" produced by Rion Co., Ltd., for example.

The particles having a diameter of 0.5 to 1.0 μm are fine particles, so that the percentage of these particles does not necessarily correspond to the quality of optical characteristics (e.g., haze).

The percentage by volume of the particles having a diameter of 0.5 to 1.0 μm can be adjusted by, for example, appropriately setting the crystallinity, the degree of saponification, and the degree of polymerization of a raw material polyvinyl alcohol resin; acetalization reaction conditions; and the acetal group content, the hydroxy group content, the crystallinity, and Mw/Hn of the polyvinyl acetal resin.

To ensure both good printability and viscosity suitable for printing, the polyvinyl acetal resin preferably has an average degree of polymerization of 200 or higher, more preferably 250 or higher, and preferably 1,900 or lower, more preferably 1,750 or lower. The average degree of polymerization can be measured in accordance with JIS K 6726.

The polyvinyl acetal resin preferably contains an acetal group-containing constitutional unit represented by the following formula (4), a hydroxy group-containing constitutional unit represented by the following formula (5), and an acetyl group-containing constitutional unit represented by the following formula (6).

[Chem.1]

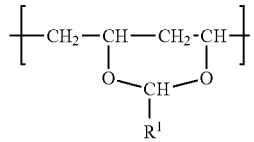
(4)

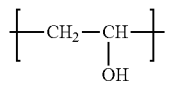
(5)

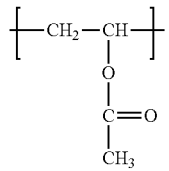
(6)

In the formula (4), $R^1$ represents a hydrogen atom or a C1-C20 alkyl group.

When in the formula (4) is a C1-C20 alkyl group, examples of the alkyl group include methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups. Preferred among these are methyl and n-propyl groups.

When the polyvinyl acetal resin contains an acetoacetal group, the acetoacetal group content is preferably 21 mol % or less.

The polyvinyl acetal resin having an acetoacetal group content of 21 mol % or less can sufficiently exhibit the effect of steric hindrance and thus can provide a paste that can be easily cleaned off. The acetoacetal group content of the polyvinyl acetal resin is more preferably 22 mol % or less, still more preferably 20 mol %.

Here, the acetoacetal group refers to an acetal group contained in an acetal group-containing constitutional unit represented by the formula (4) wherein $R^1$ is a methyl group. The acetoacetal group content of the polyvinyl acetal resin herein means the apparent acetoacetal group content of the entire polyvinyl acetal resin.

When the polyvinyl acetal resin contains a butyral group, the butyral group content is preferably 40 mol % or more and preferably 80 mol % or less.

The polyvinyl acetal resin having a butyral group content of 40 mol % or more contains residual hydroxy groups in an amount within a suitable range, and thus can have sufficient solubility in a low polarity solvent. The polyvinyl acetal resin having a butyral group content of 80 mol % or less can contain a sufficient amount of residual hydroxy groups, allowing the resulting conductive paste to have suitable viscosity and improved storage stability.

The butyral group content of the polyvinyl acetal resin is more preferably 50 mol % or more and more preferably 15 mol % or less.

Here, the butyral group refers to an acetal group contained in an acetal group-containing constitutional unit represented by the formula (4) wherein $R^1$ is a propyl group.

The butyral group content of the polyvinyl acetal resin herein means the apparent butyral group content of the entire polyvinyl acetal resin.

In the polyvinyl acetal resin, the ratio of the acetoacetal group content to the butyral group content (acetoacetal group content/butyral group content) is preferably 0 or greater, more preferably 0.05 or greater, and preferably 0.9 or smaller, more preferably 0.75 or smaller.

The polyvinyl acetal resin having a ratio of the acetoacetal group content to the butyral group content within the above range can effectively exhibit steric hindrance and can provide, a paste that can be easily cleaned off.

The total acetal group content of the polyvinyl acetal resin is preferably 60 mol % or more, more preferably 64 mol % or more, and preferably 60 mol % or less, more preferably 76 mol % or less.

In the polyvinyl acetal resin, the lower limit of the percentage of acetoacetal groups in all of the acetal groups is preferably 0 mol % and the upper limit thereof is preferably 35 mol %.

The acetal group content can be measured by NMR, for example.

Since an acetal group in a polyvinyl acetal resin is obtained by acetalizing two hydroxy groups in polyvinyl alcohol, the acetal group content is calculated by counting acetalized two hydroxy groups.

In the polyvinyl acetal resin, the lower limit of the amount of the hydroxy group-containing constitutional unit represented by the formula (5) (hereinafter also referred to as a "hydroxy group content") is preferably 16 mol % and the upper limit thereof is preferably 25 mol %.

The polyvinyl acetal resin having a hydroxy group content of 16 mol % or more can reduce the coagulation of conductive powder. The resulting conductive paste thus can have improved dispersibility and can form a smooth printed coating film. The polyvinyl acetal resin having a hydroxy group content of 25 mol % or less can have excellent solubility in low polarity organic solvents used in the present invention.

The lower limit of the hydroxy group content is more preferably 17 mol % and the upper limit thereof is more preferably 23 mol %.

The hydroxy group content can be measured by NMR, for example.

In the polyvinyl acetal resin, the lower limit of the percentage of the amount of hydroxy group-containing constitutional units having a sequence length of 1 relative to the total hydroxy group content is preferably 45%, more preferably 50%, and the upper limit thereof is preferably 75%, more preferably 70%. When the percentage is within the above range, undissolved matter can be reduced.

The sequence length of hydroxy-group containing constitutional units means the number of continuous hydroxy-group containing constitutional units represented by the formula (5). A sequence length of 1 means that a hydroxy group-containing constitutional unit is not continuous with other hydroxy group-containing constitutional units and not adjacent to other hydroxy group-containing constitutional units.

The percentage of hydroxy group-containing constitutional units having a sequence length of 1 can be measured by $^{13}$C-NMR, for example.

In the polyvinyl acetal resin, the lower limit of the amount of the acetyl group-containing constitutional unit represented by the formula (6) (hereinafter also referred to as an "acetyl group content") is preferably 0.1 mol % and the upper limit thereof is preferably 12 mol %.

The resulting polyvinyl acetal resin having an acetyl group content of 0.1 mol % or more can have appropriate steric hindrance in the resin. This makes it easy to wipe off or clean off the conductive paste from devices used in operations, such as a triple roll mill for kneading or plates for printing, and also makes it easy to replace pastes, thus increasing the coating film productivity. The polyvinyl acetal resin having an acetyl group content of 12 mol % or less can have excellent solubility in a low polarity solvent, and also can impart appropriate flexibility to a dried coating film, allowing the dried coating film to have excellent strength.

The lower limit, of the acetyl group content of the polyvinyl acetal resin is more preferably 1 mol % and the upper limit thereof is more preferably 10 mol %.

The acetyl group content can be measured by NMR, for example.

In the polyvinyl acetal resin, the lower limit of the ratio of the acetyl group content to the butyral group content (acetyl group content/butyral group content) is preferably 0.01, more preferably 0.02 and the upper limit thereof is preferably 0.35, more preferably 0.30.

The polyvinyl acetal resin preferably further contains a carboxy group-containing constitutional unit.

The polyvinyl acetal resin containing a carboxy group-containing constitutional unit can improve printability because such a polyvinyl acetal resin can be dissolved in a low polarity organic solvent, while having improved compatibility with conductive powder, which is one of the constituents of the conductive paste.

Examples of the carboxy group-containing constitutional unit include a constitutional unit represented by the following formula (7-1) and a constitutional unit, represented by following formula (7-2).

[Chem.2]

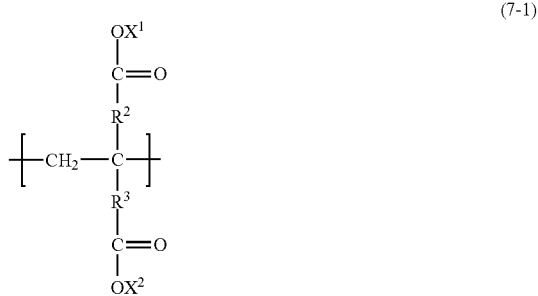

(7-1)

(7-2)

In the formula (7-1), $R^2$ and $R^3$ each independently represent a C0-C10 alkylene group, and $X^1$ and $X^2$ each independently represent a hydrogen atom, a metal atom, or a methyl group, in the formula (7-2), $R^4$, $R^5$, and $R^6$ each independently represent a hydrogen atom or a C1-C10 alkyl group, $R^7$ represents a C0-C10 alkylene group, and $X^3$ represents a hydrogen atom, a metal atom, or a methyl group. "$R^2$, $R^3$, or $R^7$ represents a C0 alkylene group" means that $R^2$, $R^3$, or $R^7$ is a single bond.

The polyvinyl acetal resin preferably contains the constitutional unit represented by the formula (7-1).

In the polyvinyl acetal resin containing the constitutional unit represented by the formula (7-1), the two carboxy groups in the constitutional unit are present on either side of the carbon of the main chain. This allows the resulting conductive paste to have appropriate interactions with conductive power, improving the storage stability.

In the formula (7-1), $R^2$ and $R^3$ each independently represent a C0-C10 alkylene group, and $X^1$ and $X^2$ each independently represent a hydrogen atom, a metal atom, or a methyl group.

In the formula (7-1), when the alkylene groups represented by $R^2$ and $R^3$ each have a carbon number of 0 to 10, coagulation of carboxy groups can be reduced, and excellent solubility in a low polarity solvent can be obtained. The lower limit of the carbon number of each of the alkylene groups represented by $R^2$ and $R^3$ is preferably 0 and the upper limit thereof is preferably 5. The lower limit is more preferably 1 and the upper limit is more preferably 3.

$R^2$ and $R^3$ may be the same as or different from each other, but are preferably different from each other. Moreover, at least one of them is preferably a single bond.

Examples of the C0-C10 alkylene group include a single bond, linear alkylene groups such as methylene, ethylene, trimethylene, tetramethylene, pentamethylene, hexamethylene, octamethylene, and decamethylene groups, branched alkylene groups such as methylmethylene, methylethylene, 1-methylpentylene, and 1,4-dimethylbutylene groups, and cyclic alkylene groups such as cyclopropylene, cyclobutylene, and cyclohexylene groups. Preferred among these are a single bond, linear alkylene groups such as methylene, ethylene, n-propylene, and n-butylene groups. More preferred are a single bond, a methylene group, and an ethylene group.

When at least one of $X^1$ or $X^2$ is a metal atom, examples of the metal atom include a sodium atom, a lithium atom, and a potassium atom. Preferred among these is a sodium atom.

The constitutional unit represented by the formula (7-1) is preferably derived from an α-dicarboxy monomer. Examples of the α-dicarboxy monomer include dicarboxylic acids having a radically polymerizable unsaturated double bond such as methylenemalonic acid, itaconic acid, 2-methyleneglutaric acid, 2-methyleneadipic acid, and 2-methylenesebacic acid, metal salts thereof, and methyl esters thereof. In particular, itaconic acid, metal salts thereof, and methyl esters thereof are preferred.

The α-dicarboxy monomer herein means a monomer having two carboxy groups on the α carbon.

The polyvinyl acetal resin preferably contains the constitutional unit represented by the formula (7-2).

The polyvinyl acetal resin containing the constitutional unit represented by the formula (7-2) can have better solubility in a solvent.

In the formula (7-2), $R^4$, $R^5$, and $R^6$ each independently represents a hydrogen atom or a C1-C10 alkyl group, $R^7$ represents a C0-C10 alkylene group, and $X^3$ represents a hydrogen atom, a metal atom, or a methyl group.

In the formula (7-2), when the alkyl groups represented by $R^4$, $R^5$, and $R^6$ each have a carbon number of 1 to 10, steric hindrance is less likely to occur, allowing polymerization reaction during the synthesis of raw materials to sufficiently proceed. The lower limit of the carbon number of each of the alkyl groups represented by $R^4$, $R^5$, and $R^6$ is preferably 1 and the upper limit, thereof is 5, more preferably 3.

$R^4$ and $R^5$ may be the same as or different from each other, but are preferably the same as each other. $R^4$, $R^5$, and $R^6$ are preferably hydrogen atoms.

Examples of the C1-C10 alkyl group include linear alkyl groups such as methyl, ethyl, propyl, n-butyl, n-pentyl, n-heptyl, n-octyl, n-nonyl, and n-decyl groups, branched alkyl groups such as isopropyl, isobutyl, sec-butyl, tert-butyl, isopentyl, 2,1-dimethylpropyl, 1,1,3,3-tetramethylbutyl, and 2-ethylhexyl groups, and cycloalkyl groups such as cyclopropyl, cyclopropylmethyl, cyclobutyl, cyclopentyl, and cyclohexyl groups. Preferred among these are linear alkyl groups such as methyl, ethyl, propyl, n-butyl groups. More preferred among these are methyl and ethyl groups.

In the formula (7-2), when the alkylene group represented by $R^6$ has a carbon number of 0 to 10, carboxy groups are less likely to coagulate, so that the resulting resin can have sufficient solubility in a low polarity solvent. The lower limit of the carbon number of the alkylene group represented by $R^7$ is preferably 0 and the upper limit thereof is preferably 5. The lower limit is more preferably 1 and the upper limit is more preferably 3.

In the formula (7-2), examples of $R^7$ include the same groups as those listed for $R^2$ and $R^3$ in the formula (7-1). Preferred among these are a single bond, linear alkylene groups such as methylene, ethylene, trimethylene, and tetramethylene groups. More preferred are a single bond, a methylene group, and an ethylene group. Still more preferred is a single bond.

When $X^3$ is a metal atom, examples of the metal atom include a sodium atom, a lithium atom, and a potassium atom. Preferred among these is a sodium atom.

The constitutional unit represented by the formula (7-2) is preferably derived from a monocarboxy monomer. Examples of the monocarboxy monomer include monocarboxylic acids having a radically polymerizable unsaturated double bond such as acrylic acid, crotonic acid, methacrylic acid, and oleic acid, metal salts thereof, and methyl esters thereof. In particular, crotonic acid, metal salts thereof, and methyl esters thereof are preferred.

In the polyvinyl acetal resin, the lower limit of the amount of carboxy group-containing constitutional units (hereinafter also referred to as a "carboxy group content") is preferably 0.01 mol %, and the upper limit thereof is preferably 1.0 mol %.

When the carboxy group content is 0.01 mol % or more, the effects due to the presence of carboxy groups in the polyvinyl acetal resin can be sufficiently exhibited. The conductive paste thus can have improved printability and excellent surface smoothness, as well as excellent storage stability. The polyvinyl acetal resin having a carboxy group content of 1 mol % or less can have improved solubility in an organic solvent. The lower limit of the carboxy group content of the polyvinyl acetal resin is preferably 0.07 mol % and the upper limit thereof is preferably 0.8 mol %. The lower limit is more preferably 0.1 mol % and the upper limit is more preferably 0.6 mol %.

The carboxy group content can be measured by NMR, for example.

The carboxy group content of the polyvinyl acetal resin herein means the percentage of carboxy group-containing constitutional units in all of the constitutional units in the polyvinyl acetal resin. The constitutional unit represented by the formula (7-1), for example, has two carboxy groups; however, regardless of the number of carboxy groups in one constitutional unit, the carboxy group content is the percentage of carboxy group-containing constitutional units in all of the constitutional units in the polyvinyl acetal resin.

Moreover, the carboxy group content of the polyvinyl acetal resin herein means the apparent carboxy group content of the entire polyvinyl acetal resin. Specifically, for example, when the polyvinyl acetal resin contains multiple resins having different carboxy group contents, the carboxy group content of the polyvinyl acetal resin can be determined toy multiplying the carboxy group content of each resin by the proportion of the resin and adding up the resulting values.

In particular, for example, for a polyvinyl acetal resin containing a carboxylic acid-modified polyvinyl acetal resin and an unmodified polyvinyl acetal resin, the carboxy group content of the polyvinyl acetal resin is calculated by the following formula (8).

$$E = F \times (G/H) \quad (8)$$

In the formula (8), E represents the amount (mol %) of carboxy group-containing constitutional units in the polyvinyl acetal resin. F represents the amount (mol %) of carboxy group-containing constitutional units in a polyvinyl acetal resin containing carboxy group-containing constitutional units. G represents the weight of the polyvinyl acetal resin containing carboxy group-containing constitutional units. H represents the weight of the entire polyvinyl acetal resin.

In the polyvinyl acetal resin, the lower limit of the ratio of the carboxy group content to the acetyl group content (carboxy group content/acetyl group content) is preferably 0.01 and the upper limit thereof is preferably 0.2. The polyvinyl acetal resin having a ratio of the carboxy group content, to the acetyl group content, within the above range enables easy washing during cleaning because steric hindrance effectively occurs in the polyvinyl acetal resin. The polyvinyl acetal resin having a ratio of the carboxy group content to the acetyl group content of 0.01 or greater can sufficiently exhibit the effect of steric hindrance. The polyvinyl acetal resin having a ratio of the carboxy group content to the acetyl group content of 0.2 or smaller can sufficiently exhibit the effect of carboxy groups, thus improving the printability. The lower limit of the ratio of the carboxy group content to the acetyl group content is more preferably 0.015 and the upper limit thereof is more preferably 0.1.

The polyvinyl acetal resin preferably contains an ethylene unit represented by the following formula (9).

[Chem.3]

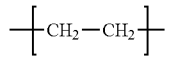

(9)

In the polyvinyl acetal resin, the lower limit of the amount of the ethylene unit (hereinafter also referred to as an "ethylene content") is preferably 1 mol %, more preferably 3 mol % and the upper limit thereof is preferably 20 mol %, more preferably 10 mol %.

The ethylene content can be measured by NMR, for example.

The ethylene content of the polyvinyl acetal resin herein means the apparent ethylene content of the entire polyvinyl acetal resin. In other words, for example, when the polyvinyl acetal resin contains multiple resins having different ethylene contents, the ethylene content of the polyvinyl acetal resin can be determined by multiplying the ethylene content of each resin by the proportion of the resin and adding op the resulting values.

In the polyvinyl acetal resin, the lower limit of the ratio of the ethylene content to the hydroxy group content (ethylene content/hydroxy group content) is preferably 0.01 and the upper limit thereof is preferably 1.0.

The polyvinyl acetal resin having a ratio of the ethylene content to the hydroxy group content can have improved solubility in a solvent and makes it possible to prepare a conductive paste having excellent printability.

The lower limit of the ratio of the ethylene content to the hydroxy group content is more preferably 0.015 and the upper limit thereof is more preferably 0.5.

The lower limit of the weight average molecular weight (Mw) of the polyvinyl acetal resin is preferably 30,000, more preferably 35,000 and the upper limit thereof is preferably 400,000, mere preferably 350,000.

The lower limit of the number average molecular weight (Mn) of the polyvinyl acetal resin is preferably 15,000, more preferably 20,000 and the upper limit thereof is preferably 150,000, more preferably 120,000.

In the polyvinyl acetal resin, the lower limit of the ratio (Mw/Mn) of the weight average molecular weight (Mw) to the number average molecular weight (Mn) is preferably 2.0, more preferably 2.2 and the upper limit thereof is preferably 4.0, more preferably 3.7.

The Mw and Mn can be measured by, for example, gel permeation chromatography (GPC) using appropriate standards (e.g., polystyrene standards). Examples of the column used in measuring the Mw and Mn include TSKgel Super-HZM-H.

The polyvinyl acetal resin can be typically produced by acetalizing polyvinyl alcohol.

The polyvinyl alcohol resin may be, for example, a conventionally known polyvinyl alcohol resin such as a resin produced by saponifying a polyvinyl acetate resin with an alkali, an acid, aqueous ammonia, or the like.

The polyvinyl alcohol resin may be completely saponified, but is not necessarily completely saponified and may be a partially saponified polyvinyl alcohol resin as long as the polyvinyl alcohol resin has at least one unit having a hydroxyl group diad for a meso or a racemo position in at least one position of the main chain. Examples of other polyvinyl alcohol resins that can be used include copolymers of vinyl alcohol and a monomer copolymerizable with vinyl alcohol, such as ethylene-vinyl alcohol copolymer resins and partially saponified ethylene-vinyl alcohol copolymer resins.

Examples of the polyvinyl acetate resin include ethylene-vinyl acetate copolymers.

The polyvinyl alcohol resin preferably has a crystallinity of 45% or lower, more preferably 38% or lower, still more preferably 37% or lower, further more preferably 36% or lower, particularly preferably 33% or lower. The lower limit thereof is not limited, and is preferably 3% or higher.

Use of the polyvinyl alcohol resin allows the number of particles of undissolved matter to be within a predetermined range as measured by the above method.

The crystallinity can be measured by differential scanning calorimetry (DSC), as descried later in Examples.

The crystallinity of the polyvinyl acetal resin herein means the apparent crystallinity of the entire polyvinyl acetal resin. In other words, for example, when the polyvinyl acetal resin contains multiple resins having different crystallinities, the crystallinity of the polyvinyl acetal resin can be determined by multiplying the crystallinity of each resin by the proportion of the resin and adding up the resulting values.

The polyvinyl alcohol resin preferably has a degree of saponification of 70 mol % or higher and 99.4 mol % or lower, more preferably 78 mol % or higher and 98 mol % or lower.

Use of the polyvinyl alcohol resin allows the number of particles of undissolved matter to be within a predetermined range as measured by the above method.

The acetalization may be carried out by a known method, and is preferably carried out in a water solvent, a solvent mixture containing water and an organic solvent compatible with water, or an organic solvent.

The organic solvent compatible with water may be, for example, an alcoholic organic solvent.

Examples of the organic solvent include alcoholic organic solvents, aromatic organic solvents, aliphatic ester solvents, ketone solvents, lower paraffin solvents, ether solvents, amide solvents, and amine solvents. Examples of the alcoholic organic solvents include methanol, ethanol, n-propanol, isopropanol, n-butanol, and tert-butanol.

Examples of the aromatic organic solvents include xylene, toluene, ethyl benzene, and methyl benzoate.

Examples of the aliphatic ester solvents include methyl acetate, ethyl acetate, butyl acetate, methyl propionate, ethyl propionate, methyl butyrate, ethyl butyrate, methyl acetoacetate, and ethyl acetoacetate.

Examples of the ketone solvents include acetone, methyl ethyl ketone, methyl isobutyl ketone, cyclohexanone, methyl cyclohexanone, benzophenone, and acetophenone.

Examples of the lower paraffin solvents include hexane, pentane, octane, cyclohexane, and decane.

Examples of the ether solvents include diethyl ether, tetrahydrofuran, ethylene glycol dimethyl ether, ethylene glycol diethyl ether, and propylene glycol diethyl ether.

Examples of the amide solvents include N,N-dimethylformamide, N,N-dimethylacetamide, N-methylpyrrolidone, and acetanilide.

Examples of the amine solvents include ammonia, trimethylamine, triethylamine, n-butylamine, di-n-butylamine, tri-n-butylamine, aniline, N-methylaniline, N,N-dimethylaniline, and pyridine.

These may be used alone or in admixture of two or more thereof. From the standpoint of the ability to dissolve resin and easy purification, particularly preferred among these are ethanol, n-propanol, isopropanol, and tetrahydrofuran.

The acetalization is preferably carried out in the presence of an acid catalyst.

The acid catalyst is not limited, and examples thereof include mineral acids such as sulfuric acid, hydrochloric acid, nitric acid, and phosphoric acid, carboxylic acids such as formic acid, acetic acid, and propionic acid, and sulfonic acids such as methanesulfonic acid, ethanesulfonic acid, benzenesulfonic acid, and p-toluenesulfonic acid. These acid catalysts may be used alone, or two or more types of compounds may be used in combination. Preferred among these are hydrochloric acid, nitric acid, and sulfuric acid, and particularly preferred is hydrochloric acid.

In the method for producing the polyvinyl acetal resin of the present invention, the polyvinyl alcohol resin is preferably stirred for two hours or longer at 90° C. or higher before starting acetalization.

Stirring for two hours or longer allows the polyvinyl alcohol resin to be sufficiently dissolved, thus sufficiently increasing the degree of acetalization and reducing undissolved matter.

The aldehyde used for the acetalization may be an aldehyde having a C1-C10 chain aliphatic group, a C1-C10 cyclic aliphatic group, or a C1-C10 aromatic group. The aldehyde used may be a conventionally known aldehyde. The aldehyde used for the acetalization reaction is not limited, and examples thereof include aliphatic aldehydes and aromatic aldehydes.

Examples of the aliphatic aldehydes include formaldehyde, acetaldehyde, propionaldehyde, n-butyraldehyde, isobutyraldehyde, n-valeraldehyde, n-hexylaldehyde, 2-ethylbutyraldehyde, 2-ethylhexylaldehyde, n-heptylaldehyde, n-octylaldehyde, n-nonylaldehyde, n-decylaldehyde, and amylaldehyde.

Examples of the aromatic aldehydes include benzaldehyde, cinnamaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde.

These aldehydes may be used alone, or two or more types thereof may be used in combination. Preferred among these aldehydes are formaldehyde, acetaldehyde, butyraldehyde, 2-ethylhexylaldehyde, and n-nonylaldehyde because they are excellent in acetalization reactivity and can give the resin to be prepared a sufficient internal plasticization effect to impart favorable flexibility. More preferred are formaldehyde, acetaldehyde, and butyraldehyde because they can provide an adhesive composition particularly excellent in impact resistance and adhesiveness to metal.

The amount of the aldehyde can be appropriately determined in accordance with the acetal group content of the aimed polyvinyl acetal resin. In particular, it is preferred that the amount is 60 to 95 mol %, preferably 65 to 90 mol % relative to 100 mol % of the polyvinyl alcohol because the acetalization reaction can be efficiently carried out and unreacted aldehyde can be easily removed.

The polyvinyl acetal resin having a carboxy group-containing constitutional unit may be synthesized by any method. An exemplary method includes copolymerizing vinyl acetate with an α-dicarboxy monomer to serve as the constitutional unit represented by the formula (7-1) or with a monocarboxy monomer to serve as the constitutional unit represented by the formula (7-2), saponifying the resulting polyvinyl acetate, and acetalizing the resulting polyvinyl alcohol resin by a conventionally known method. Another exemplary method includes reacting an unmodified polyvinyl alcohol resin with a carboxy-group containing compound such as mercaptopropionic acid to perform post-modification, and acetalizing the resulting carboxylic acid-modified polyvinyl alcohol resin by a conventionally known method. Yet another exemplary method includes reacting an unmodified polyvinyl acetal resin with a carboxy-group containing compound such as mercaptopropionic acid to perform post-modification.

Preferred among these is a method including acetalizing a carboxylic acid-modified polyvinyl alcohol resin by a conventionally known method. In other words, the carboxylic acid-modified polyvinyl acetal resin is preferably an acetalized product of a carboxylic acid-modified polyvinyl alcohol resin.

When the carboxylic acid-modified polyvinyl acetal resin is an acetalized product of a carboxylic acid-modified polyvinyl alcohol resin, acetyl groups and carboxy groups are positioned relatively close in the carboxylic acid-modified polyvinyl acetal resin. Such a carboxylic acid-modified polyvinyl acetal resin can provide excellent paste removability because the acetyl groups, which cause steric hindrance, form adequate space around the carboxy groups, which have the effect of improving the compatibility with conductive powder.

In contrast, in a carboxylic acid-modified polyvinyl acetal resin obtained by introducing carboxy groups into an unmodified polyvinyl acetal resin by post-modification, acetyl groups are more distant from carboxy groups than in an acetalized product of a carboxylic acid-modified polyvinyl alcohol resin. The steric hindrance of the acetyl groups thus may have a weaker effect, leading to insufficient paste removability.

The α-dicarboxy monomer or monocarboxy monomer used in preparing the polyvinyl acetate by copolymerization is preferably methyl ester, because it does not cause hydrolysis acetyl groups derived from vinyl acetate before saponification, enabling a higher degree of saponification in producing a polyvinyl alcohol resin in the subsequent saponifying step. Moreover, the use of methyl ester can reduce the amount of sodium hydroxide to be added in the saponifying step, making it possible to reduce the sodium ion content of the polyvinyl alcohol resin, and in turn that of the carboxylic acid-modified polyvinyl acetal resin.

Even when the α-dicarboxy monomer or monocarboxy monomer is methyl ester, the resulting polyvinyl alcohol resin has ester-free carboxylic acid units because the subsequent saponifying step involves hydrolysis.

In the case of using a monomer in which $X^1$ and $X^2$ are hydrogen atoms or metal atoms among the α-dicarboxy monomers that are to serve as the constitutional unit represented by the formula (7-1), more sodium hydroxide is consumed during saponification to hydrolyze acetyl groups derived from the vinyl acetate. This may cause the resulting carboxylic acid-modified polyvinyl acetal resin to have a relatively high sodium ion content.

The conductive paste of the present invention may contain other resins such as acrylic resin or ethylcellulose in addition to the above polyvinyl acetal resin as long as the effects of the present invention are not impaired.

The conductive paste of the present invention contains an organic solvent.

The organic solvent may be one typically used in conductive pastes. In particular, to prevent a sheet attack phenomenon, the organic solvent is preferably a noncompatible, low polarity organic solvent that does not swell or dissolve the polyvinyl butyral contained in a ceramic green sheet and that has a solubility parameter of 8.5 to 14.0 $(cal/cm^3)^{0.5}$. The solubility parameter used is calculated by the Fedors method.

Examples of the organic solvent include terpineol derivatives such as dihydroterpineol, terpinyl acetate, isobornyl acetate, dihydroterpinyl acetate, dihydroterpinyl methyl ether, and terpinyl methyl ether, hydrocarbon solvents such as mineral spirits, and ethers and esters such as dipropylene glycol monomethyl ether and dipropylene glycol monomethyl ether acetate. Preferred among these are dihydroterpineol and dihydroterpinyl acetate. These organic solvents may be used alone or in combination of two or more thereof.

The amount of the organic solvent to be added is not limited. The lower limit thereof relative to 100 parts by weight of the polyvinyl acetal resin is preferably 100 parts by weight, and the upper limit thereof is preferably 10,000 parts by weight. The organic solvent in an amount of 100 parts by weight or more allows the conductive paste to have a viscosity within a suitable range and can improve the printability. The organic solvent in an amount of 10,000 parts by weight or less allows the polyvinyl acetal resin to sufficiently exhibit its performance in the conductive paste. The lower limit of the amount of the organic solvent to be added relative to 100 parts by weight of the polyvinyl acetal resin is more preferably 200 parts by weight, and the upper limit thereof is more preferably 5,000 parts by weight.

The conductive paste of the present invention contains a conductive powder.

The conductive powder is not limited. Examples thereof include powders made of nickel, aluminum, silver, copper, and alloys thereof. These conductive powders may be used alone or in combination thereof. Preferred among these is nickel powder because it has excellent conductivity.

Preferably, the conductive powder has an average particle size of 50 to 300 nm and has a substantially spherical shape. The conductive powder having an average particle size of 50 nm or greater can have a suitable specific surface area and can have improved dispersibility. The conductive powder having an average particle size of 300 nm or smaller can improve surface smoothness after printing. The substantially spherical shape includes a shape similar to a spherical shape, in addition to a true spherical shape.

The amount of the conductive powder to be added is not limited. The lower limit thereof relative to 100 parts by weight of the polyvinyl acetal resin is preferably 100 parts by weight and the upper limit thereof is preferably 10,000 parts by weight.

The conductive powder in an amount of 100 parts by weight or more can have a density within a sufficient range in the conductive paste, providing excellent conductivity. The conductive powder in an amount of 10,000 parts by weight or less can have improved dispersibility in the conductive paste, so that excellent printability can be obtained.

The lower limit of the amount of the conductive powder to be added relative to 100 parts by weight of the polyvinyl acetal resin is more preferably 200 parts by weight, and the upper limit thereof is mere preferably 5,000 parts by weight.

The conductive paste of the present invention preferably further contains ceramic powder in addition to the conductive powder. The conductive paste containing ceramic powder makes it easy to adjust the shrinking behavior of the conductive powder to that of a ceramic green sheet during firing.

The ceramic powder is not limited, and is preferably barium titanate powder used in green sheets. The average particle size of the ceramic powder is not limited, and is preferably smaller than the average particle size of the conductive powder. Specifically, the average particle size of the ceramic powder is preferably 30 nm to 200 nm.

The conductive paste of the present invention may appropriately contain a plasticizer, a lubricant, an antistatic agent, a dispersant, a surfactant, and/or the like as long as the effects of the present invention are not impaired.

Examples of the plasticizer include: phthalate diesters such as dioctyl phthalate (DOP) and dibutyl phthalate (DBP); adipate diesters such as dioctyl adipate; and alkylene glycol diesters such as triethylene glycol-di-2-ethylhexanoate, tetraethylene glycol-di-2-ethylhexanoate, triethylene glycol-di-2-ethylbutyrate, tetraethylene glycol-di-2-ethylbutyrate, tetraethylene glycol-di-heptanoate, and triethylene glycol-di-heptanoate.

The dispersant is not limited. Examples of suitable dispersants include fatty acids, aliphatic amines, alkanolamides, and phosphates. Silane coupling agents or the like may also be added.

Examples of the fatty acids include, but not limited to, saturated fatty acids such as behenic acid, stearic acid, palmitic acid, myristic acid, lauric acid, capric acid, caprylic acid, and coconut fatty acid; and unsaturated fatty acids such as oleic acid, linoleic acid, linolenic acid, sorbic acid, tallow fatty acid, and hydroxystearic acid. Suitable fatty acids among these include lauric acid, stearic acid, and oleic acid.

Examples of the aliphatic amines include, but not limited to, laurylamine, myristylamine, cetylamine, stearylamine, oleylamine, alkyl (coconut) amine, alkyl (hydrogenated tallow) amine, alkyl (tallow) amine, and alkyl (soybean) amine.

Examples of the alkanolamides include, but not limited to, coconut fatty acid diethanolamide, tallow fatty acid diethanolamide, lauric acid diethanolamide, and oleic acid diethanolamide.

Examples of the phosphates include, but not limited to, polyoxyethylene alkyl ether phosphate and polyoxyethylene alkyl allyl ether phosphate.

Examples of the surfactant include, but not limited to, anionic surfactants such as carboxylic acid surfactants (e.g., sodium salts of fatty acids), sulfonic acid surfactants (e.g., sodium linear alkyl benzenesulfonate, sodium lauryl sulfate, and alkyl polyoxysulfate), and phosphoric acid surfactants (e.g., monoalkyl phosphates), cationic surfactants such as alkyltrimethylammonium salts, dialkyldimethylammonium salts, and alkylbenzyldimethylammonium salts, and amphoteric surfactants such as alkyldimethylamine oxide and alkylcarboxybetaine. Examples also include nonionic surfactants such as polyoxyethylene alkyl ether, fatty acid sorbitan ester, alkylpolyglucoside, fatty acid diethanolamide, and alkyl monoglyceryl ether.

The dispersants and the surfactants are also effective to reduce the viscosity increase of the paste or the resin solution with time.

The method for producing the conductive paste is not limited. For example, the conductive paste may be produced by a method including mixing the polyvinyl acetal resin, the conductive powder, the organic solvent, and optional various additives in any of various mixers such as a ball mill, a blender mill, or a triple roll mill.

A multilayer ceramic capacitor can be obtained as follows. The conductive paste of the present invention is applied to ceramic green sheets by a printing process. Several of these sheets are stacked and thermally pressure-bonded to prepare a laminate. The laminate is then debound and fired to form a ceramic sintered body. On the end surfaces of the ceramic sintered body are then formed external electrodes, whereby a multilayer ceramic capacitor is obtained. The printing process may be screen printing, die coating, or gravure offset printing, for example. Such a multilayer ceramic capacitor is also encompassed by the present invention.

The conductive paste of the present invention leaves less undissolved matter, and thus can form a smooth film when applied by the printing process. Even after debinding, the resulting film can be smooth with fewer voids, making it possible to obtain a ceramic capacitor having excellent electrical characteristics.

The conductive paste of the present invention may be printed by any method. The conductive paste may be printed by a printing process such as screen printing, die coating method, or gravure printing, as mentioned above. The viscosity in printing may be appropriately adjusted, because suitable viscosity varies depending on the printing process. For example, for screen printing, the viscosity at a shear rate of 10,000 s$^{-1}$ is preferably 0.5 to 1.0 Pa·s. For example, for gravure printing, the viscosity at a shear rate of 10,000 s$^{-1}$ is preferably 0.05 to 0.5 Pa·s.

Advantageous Effects of Invention

The present invention can provide a conductive paste which leaves less fine undissolved matter when dissolved in an organic solvent and thus can be easily filtrated, and which has excellent printability and can exhibit excellent surface smoothness after printing.

DESCRIPTION OF EMBODIMENTS

The present invention is more specifically described in the following with reference to, but not limited to, examples.

Example 1

(Preparation of Polyvinyl Acetal Resin)

An amount of 100 g of a polyvinyl alcohol resin A (average degree of polymerization 1,750, degree of saponification 88 mol %, crystallinity 16%) was added to 1,000 g of pure water, and stirred at a temperature of 90° C. for two hours for dissolution. This solution was cooled to 40° C. To the solution were added 90 g of hydrochloric acid (concentration 35% by weight), 30 g of acetaldehyde, and 40 g of n-butyraldehyde. The solution temperature was decreased to 10° C., and this temperature was maintained while acetalization reaction was performed. After the reaction was completed, neutralization, washing with water, and drying were performed, whereby white powder of a polyvinyl acetal resin was obtained.

The crystallinity of the polyvinyl alcohol resin was measured by the following method.

Specifically, the polyvinyl alcohol resin was subjected to differential scanning calorimetry using a thermal analyzer (produced by Hitachi High-Tech Science Corporation, "DSC6200R") under the following conditions. The heat of fusion in the second heating was measured to measure the crystallinity.

<Measure Conditions>

0° C. (holding for five minutes)→(first heating at heating rate of 10° C./min)→270° C.→(cooling at cooling rate of 10° C./min)→0° C. (holding for five minutes)→(second heating at heating rate of 10° C./min)→270° C.

Figure 1:
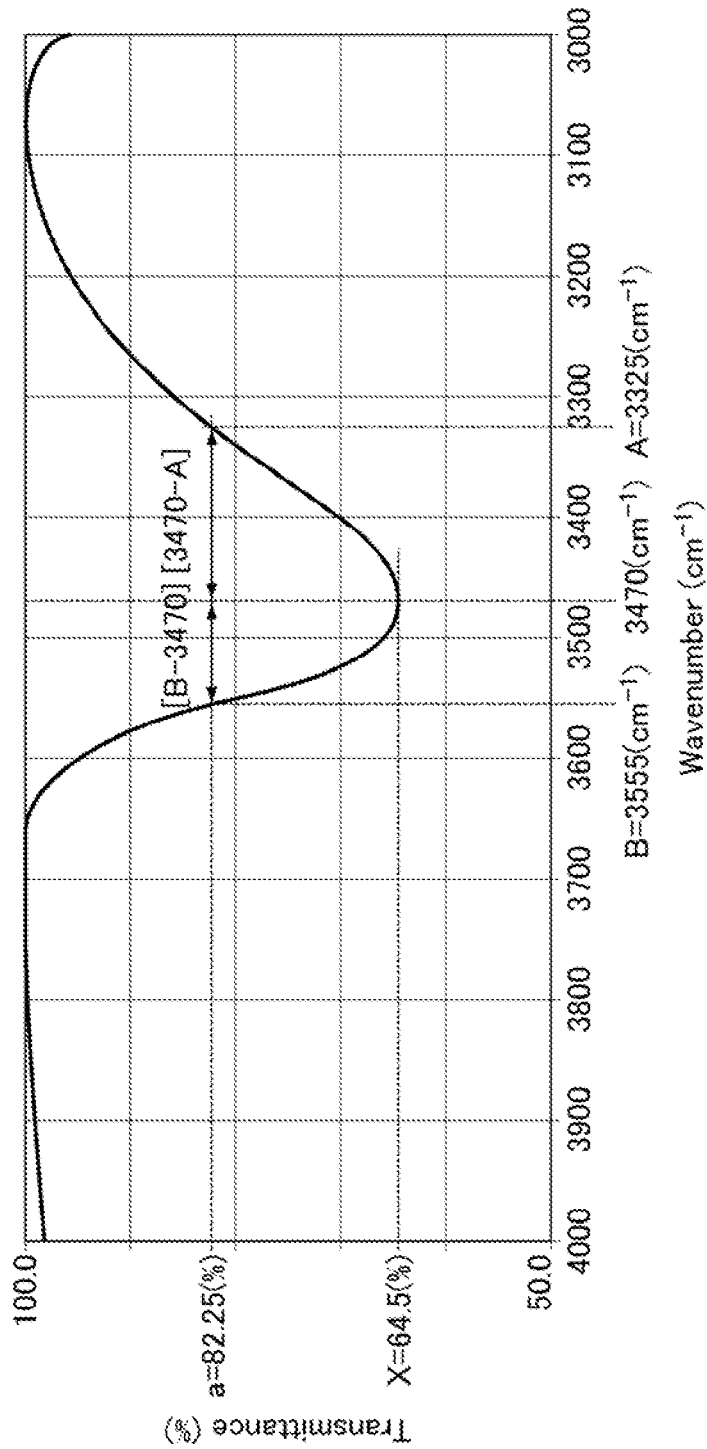
FIG. 1 is an exemplary IR absorption spectrum of the polyvinyl acetal resin according to the present invention obtained by IR absorption spectrometry.
Figure 2:
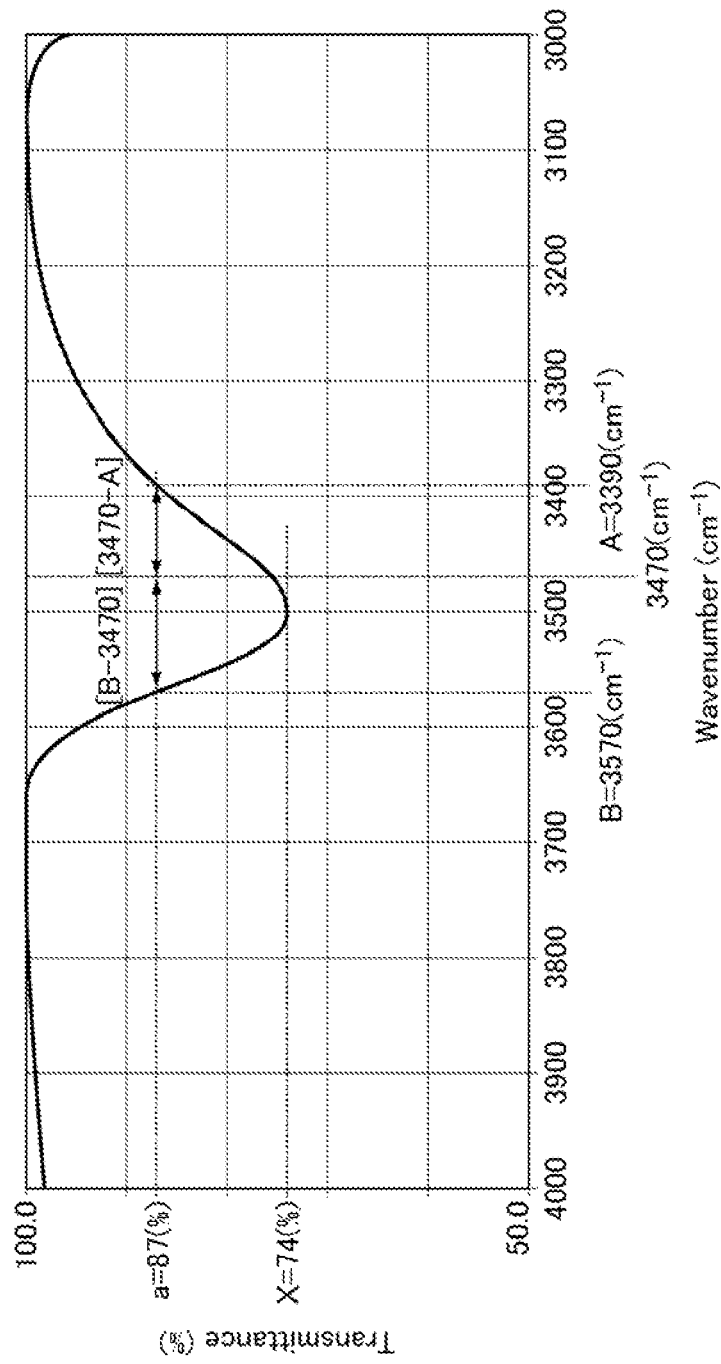
FIG. 2 is an exemplary IR absorption spectrum of the polyvinyl acetal resin according to the present invention obtained by IR absorption spectrometry.
Figure 3:
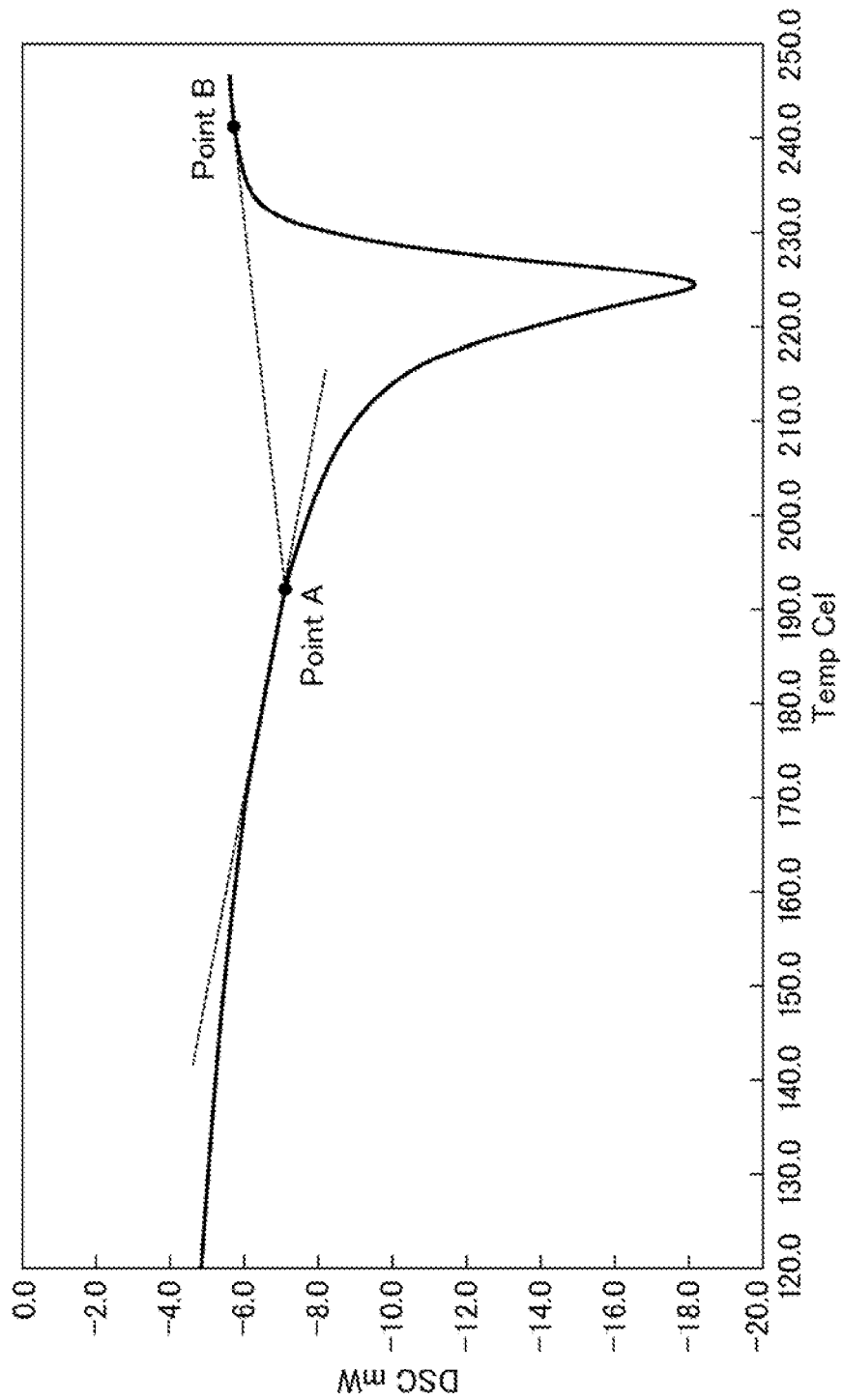
FIG. 3 is a schematic view of a DSC curve.

The heat of fusion was calculated from the area of a peak appearing between 100° C. and 270° C. in the second heating. The area of the peak was, as shown in FIG. 3, determined as the area of the region surrounded by the straight line connecting the points A and B and the DSC curve. The point A was the point at which a straight line drawn along the linear approximation portion of the DSC curve from 170° C. toward the higher temperature side leaves the DSC curve. The point B was the point on the DSC curve that shows the end-of-melt temperature. The crystallinity was calculated assuming that the heat of fusion of a polyvinyl alcohol resin having a crystallinity of 100% was 156 J/g.

(Preparation of Conductive Paste)

The obtained polyvinyl acetal resin (10 parts by weight) was dissolved in 90 parts by weight of dihydroterpineol to prepare a resin solution. Then, 180 parts by weight of nickel powder as a conductive powder and 20 parts by weight of barium titanate were mixed with 50 parts by weight of dihydroterpineol, and then mixed with the obtained resin solution, followed by dispersion in a triple roll mill. A conductive paste was thus obtained.

Example 2

White powder of a polyvinyl acetal resin was obtained as in Example 1, except that 100 g of a carboxylic acid-modified polyvinyl alcohol resin B was used instead of 100 g of the polyvinyl alcohol resin A.

The carboxylic acid-modified polyvinyl alcohol resin B contained a carboxy group-containing constitutional unit represented by the formula (7-1) (in the formula (7-1), R$^2$ is a single bond, R$^3$ is CH$_2$, X$^1$ and X$^2$ are hydrogen atoms), had an average degree of polymerization of 1,750, a degree of saponification of 89.2 mol %, a carboxy group content of 0.8 mol %, and a crystallinity of 19%.

A conductive paste was obtained as in Example 1 using the obtained polyvinyl acetal resin.

Example 3

White powder of a polyvinyl acetal resin was obtained as in Example 1, except that a polyvinyl alcohol resin C (average degree of polymerization 1,750, degree of saponification 99 mol %, crystallinity 29%) was used instead of 100 g of the polyvinyl alcohol resin A and that the aldehydes used for reaction were changed to 25 g of acetaldehyde and 57 g of n-butyraldehyde.

A conductive paste was obtained as in Example 1 using the obtained polyvinyl acetal resin.

Example 4

White powder of a polyvinyl acetal resin was obtained as in Example 1, except that 100 g of a polyvinyl alcohol resin D (average degree of polymerization 1,750, degree of saponification 96 mol %, crystallinity 22%) was used instead of 100 g of the polyvinyl alcohol resin A and that the aldehydes used for reaction were changed to 90 g of n-butyraldehyde.

A conductive paste was obtained as in Example 1 using the obtained polyvinyl acetal resin.

Example 5

White powder of a polyvinyl acetal resin was obtained as in Example 1, except that 100 g of a carboxylic acid-modified polyvinyl alcohol resin E was used instead of 100 g of the polyvinyl alcohol resin A and that the aldehydes used for reaction were changed to 90 g of n-butyraldehyde.

The carboxylic acid-modified polyvinyl alcohol resin E contained a carboxy group-containing constitutional unit represented by the formula (7-1) (in the formula (7-1), $R^2$ is a single bond, $R^3$ is $CH_2$, and $X^1$ and $X^2$ are hydrogen atoms) and had an average degree of polymerization of 1,750, a degree of saponification of 97.9 mol %, a carboxy group content of 0.1 mol %, and a crystallinity of 22%.

A conductive paste was obtained as in Example 1 using the obtained polyvinyl acetal resin.

Example 6

White powder of a polyvinyl acetal resin was obtained as in Example 1, except that 100 g of a polyvinyl alcohol resin F (average degree of polymerization 1,750, degree of saponification 98 mol %, crystallinity 26%) was used instead of 109 g of the polyvinyl alcohol resin A and that the aldehydes used for reaction were changed to 95 g of n-butyraldehyde.

A conductive paste was obtained as in Example 1 using the obtained polyvinyl acetal resin.

Example 7

White powder of a polyvinyl acetal resin was obtained as in Example 1, except that 100 g of a polyvinyl alcohol resin G (average degree of polymerization 900, degree of saponification 96 mol %, crystallinity 32%) was used instead of 100 g of the polyvinyl alcohol resin A and that the aldehydes used for reaction were changed to 85 g of n-butyraldehyde.

A conductive paste was obtained as in Example 1 using the obtained polyvinyl acetal resin.

Example 8

White powder of a polyvinyl acetal resin was obtained as in Example 1, except that 100 g of a polyvinyl alcohol resin B (average degree of polymerization 900, degree of saponification 90 mol %, crystallinity 29%) was used instead of 100 g of the polyvinyl alcohol resin A and that the aldehydes used for reaction were changed to 15 g of acetaldehyde and 70 g of n-butyraldehyde.

A conductive paste was obtained as in Example 1 using the obtained polyvinyl acetal resin.

Example 9

White powder of a polyvinyl acetal resin was obtained as in Example 1, except that 100 g of a polyvinyl alcohol resin J (average degree of polymerization 600, degree of saponification 98 mol %, crystallinity 38l) was used instead of 100 g of the polyvinyl alcohol resin A and that the aldehydes used for reaction were changed to 30 g of acetaldehyde and 70 g of n-butyraldehyde.

A conductive paste was obtained as in Example 1 using the obtained polyvinyl acetal resin.

Example 10

White powder of a polyvinyl acetal resin was obtained as in Example 1, except that 100 g of a polyvinyl alcohol resin K (average degree of polymerization 600, degree of saponification 99 mol %, crystallinity 38%) was used instead of 100 g of the polyvinyl alcohol resin A and that the aldehydes used for reaction were changed to 90 g of n-butyraldehyde.

A conductive paste was obtained as in Example 1 using the obtained polyvinyl acetal resin.

Example 11

White powder of a polyvinyl acetal resin was obtained as in Example 1, except that 100 g of a polyvinyl alcohol resin L (average degree of polymerization 600, degree of saponification 96 mol %, crystallinity 3.5%) was used instead of 100 g of the polyvinyl alcohol resin A and that, the aldehydes used for reaction were changed to 20 g of acetaldehyde and 70 g of n-butyraldehyde.

A conductive paste was obtained as in Example 1 using the obtained polyvinyl acetal resin.

Example 12

White powder of a polyvinyl acetal resin, was obtained as in Example 1, except that 100 g of a polyvinyl alcohol resin M (average degree of polymerization 400, degree of saponification 98 mol %, crystallinity 42%) was used instead of 100 g of the polyvinyl alcohol resin A and that the aldehydes used for reaction were changed to 25 g of acetaldehyde and 70 g of n-butyraldehyde.

A conductive paste was obtained as in Example 1 using the obtained polyvinyl acetal resin.

Example 13

White powder of a polyvinyl acetal resin was obtained as in Example 1, except that 100 g of a polyvinyl alcohol resin N (average degree of polymerization 400, degree of saponification 96 mol %, crystallinity 38%) was used instead of 100 g of the polyvinyl alcohol resin A and that the aldehydes used for reaction were changed to 30 g of acetaldehyde and 55 g of n-butyraldehyde.

A conductive paste was obtained as in Example 1 using the obtained polyvinyl acetal resin.

Example 14

White powder of a polyvinyl acetal resin was obtained as in Example 1, except that 100 g of a polyvinyl alcohol resin P (average degree of polymerization 250, degree of saponification 88 mol %, crystallinity 32%) was used instead of 100 g of the polyvinyl alcohol resin A and that the aldehydes used for reaction were changed to 30 g of acetaldehyde and 45 g of n-butyraldehyde.

A conductive paste was obtained as in Example 1 using the obtained polyvinyl acetal resin.

Example 15

White powder of a polyvinyl acetal resin was obtained as in Example 1, except that 100 g of a carboxylic acid-modified polyvinyl alcohol resin Q was used instead of 100 g of the polyvinyl alcohol resin A and that the aldehydes used for reaction were changed to 15 g of acetaldehyde and 70 g of n-butyraldehyde.

The carboxylic acid-modified polyvinyl alcohol resin Q contained a carboxy group-containing constitutional unit represented by the formula (7-2) (in the formula (7-2), $R^4$ is $CH_3$, $R^5$ and $R^6$ are hydrogen atoms, $R^7$ is a single bond, and $X^3$ is a hydrogen atom) and had an average degree of polymerization of 250, a degree of saponification of 87 mol %, a carboxy group content of 1 mol %, and a crystallinity of 29%.

A conductive paste was obtained as in Example 1 using the obtained polyvinyl acetal resin.

Example 16

White powder of a polyvinyl acetal resin was obtained as in Example 1, except that 100 g of a polyvinyl alcohol resin R (average degree of polymerization 250, degree of saponification 90 mol %, crystallinity 32%) was used instead of 100 g of the polyvinyl alcohol resin A and that the aldehydes used for reaction were changed to 30 g of acetaldehyde and 60 g of n-butyraldehyde.

A conductive paste was obtained as in Example 1 using the obtained polyvinyl acetal resin.

Example 17

White powder of a polyvinyl acetal resin was obtained as in Example 1, except that 100 g of a carboxylic acid-modified polyvinyl alcohol resin S was used instead of 100 g of the polyvinyl alcohol resin A and that the aldehydes used for reaction were changed to 95 g of n-butyraldehyde.

The carboxylic acid-modified polyvinyl alcohol resin S contained a carboxy group-containing constitutional unit represented by the formula (7-1) (in the formula (7-1), $R^2$ is a single bond, $R^3$ is $CH_2$, and $X^1$ and $X^2$ are hydrogen atoms) and had an average degree of polymerization of 250, a degree of saponification of 98.99 mol %, a carboxy group content of 0.01 mol %, and a crystallinity of 45%.

A conductive paste was obtained as in Example 1 using the obtained polyvinyl acetal resin.

Example 18

White powder of a polyvinyl acetal resin was obtained as in Example 1, except that 100 g of a polyvinyl alcohol resin T (average degree of polymerization 250, degree of saponification 99 mol %, crystallinity 45%) was used instead of 100 g of the polyvinyl alcohol resin A and that the aldehydes used for reaction were changed to 95 g of n-butyraldehyde.

A conductive paste was obtained as in Example 1 using the obtained polyvinyl acetal resin.

Example 19

White powder of a polyvinyl acetal resin was obtained as in Example 1, except that 100 g of a carboxylic acid-modified polyvinyl alcohol resin 2 was used instead of 100 g of the polyvinyl alcohol resin A and that the aldehydes used for reaction were changed to 15 g of acetaldehyde and 80 g of n-butyraldehyde.

The carboxylic acid-modified polyvinyl alcohol resin Z contained a carboxy group-containing constitutional unit represented by the formula (7-1) (in the formula (7-1), is a single bond, $R^3$ is $CH_2$, and $X^1$ and $X^2$ are hydrogen atoms) and had an average degree of polymerization of 600, a degree of saponification of 96 mol %, a carboxy group content of 0.1 mol %, and a crystallinity of 20%.

A conductive paste was obtained as in Example 1 using the obtained polyvinyl acetal resin.

Example 20

White powder of a polyvinyl acetal resin was obtained as in Example 1, except that 100 g of a polyvinyl alcohol resin α (average degree of polymerization 1,750, degree of saponification 93 mol %, ethylene content 5 mol %, crystallinity 25%) was used instead of 100 g of the polyvinyl alcohol resin A and that the aldehydes used for reaction were changed to 95 g of n-butyraldehyde. A conductive paste was obtained as in Example 1 using the obtained polyvinyl acetal resin.

Example 21

White powder of a polyvinyl acetal resin was obtained as in Example 1, except that 100 g of a polyvinyl alcohol resin β (average degree of polymerization 400, degree of saponification 96 mol %, ethylene content 10 mol %, crystallinity 25%) was used instead of 100 g of the polyvinyl alcohol resin A and that the aldehydes used for reaction were changed to 30 g of acetaldehyde and 55 g of n-butyraldehyde.

A conductive paste was obtained as in Example 2 using the obtained polyvinyl acetal resin.

Example 22

White powder of a polyvinyl acetal resin was obtained as in Example 1, except that 50 g of a carboxylic acid-modified polyvinyl alcohol resin Z and 50 g of the polyvinyl alcohol resin β were used instead of 100 g of the polyvinyl alcohol resin A and that the aldehydes used for reaction were changed to 10 g of acetaldehyde and 85 g of n-butyraldehyde.

A conductive paste was obtained as in Example 1 using the obtained polyvinyl acetal resin.

Comparative Example 1

White powder of a polyvinyl acetal resin, was obtained as in Example 1, except that 100 g of a polyvinyl alcohol resin U (average degree of polymerization 2,000, degree of saponification 88 mol %, crystallinity 35%) was used instead of 100 g of the polyvinyl alcohol resin A and that the aldehydes used in reaction were changed to 15 g of acetaldehyde and 75 g of n-butyraldehyde.

A conductive paste was obtained as in Example 1 using the obtained polyvinyl acetal resin.

Comparative Example 2

White powder of a polyvinyl acetal resin was obtained as in Example 1, except that 100 g of a polyvinyl alcohol resin V (average degree of polymerization 2,000, degree of saponification 99 mol %, crystallinity 38%) was used instead of 100 g of the polyvinyl alcohol resin A and that the aldehydes used in reaction were changed to 40 g of acetaldehyde and 45 g of n-butyraldehyde.

Preparation of a conductive paste using the obtained polyvinyl acetal resin was attempted as in Example 1.

However, the resin was not dissolved in dihydroterpineol, so that no conductive paste was obtained.

Here, "resin is dissolved" means that 10% by weight or more of precipitate is not formed relative to the weight of the added resin, whereas "resin is not dissolved" means that 10% by weight or more of precipitate is formed relative to the weight of the added resin.

Comparative Example 3

White powder of a polyvinyl acetal resin was obtained as in Example 1, except that 100 g of a polyvinyl alcohol resin W (average degree of polymerization 1,750, degree of saponification 85 mol %, crystallinity 13%) was used instead of 100 g of the polyvinyl alcohol resin A and that the aldehydes used in reaction were changed to 40 g of acetaldehyde and 25 g of n-butyraldehyde.

Preparation of a conductive paste using the obtained polyvinyl acetal resin was attempted as in Example 1. However, the resin was not dissolved in dihydroterpineol, so that no conductive paste was obtained.

Comparative Example 4

White powder of a polyvinyl acetal resin was obtained as in Example 1, except that 100 g of a polyvinyl alcohol resin X (average degree of polymerization 500, degree of saponification 85 mol %, crystallinity 26%) was used instead of 100 g of the polyvinyl alcohol resin A and that, the aldehydes used in reaction were changed to 40 g of acetaldehyde and 25 g of n-butyraldehyde.

Preparation of a conductive paste using the obtained polyvinyl acetal resin was attempted as in Example 1. However, the resin was not dissolved in dihydroterpineol, so that no conductive paste was obtained.

Comparative Example 5

White powder of a polyvinyl acetal resin was obtained as in Example 1, except that 100 g of a polyvinyl alcohol resin Y (average degree of polymerization 1,750, degree of saponification 99.9 mol %, crystallinity 38%) was used instead of 100 g of the polyvinyl alcohol resin A and that the aldehydes used in reaction were changed to 95 g of n-butyraldehyde.

A conductive paste was obtained as in Example 1 using the obtained polyvinyl acetal resin.

Comparative Example 5

White powder of a polyvinyl acetal resin was obtained as in Example 1, except that 100 g of a polyvinyl alcohol resin Y (average degree of polymerization 500, degree of saponification 99.9 mol %, crystallinity 71%) was used instead of 100 q of the polyvinyl alcohol resin A and that the aldehydes used in reaction were changed to 95 g of n-butyraldehyde.

A conductive paste was obtained as in Example 1 using the obtained polyvinyl acetal resin.

Comparative Example 7

White powder of a polyvinyl acetal resin was obtained as in Example 1, except that 100 g of a polyvinyl alcohol resin γ (average degree of polymerization 1,750, degree of saponification 99.2 mol %, crystallinity 35%) was used instead of 100 g of the polyvinyl alcohol resin A and that the aldehydes used in reaction were changed to 70 g of n-butyraldehyde.

Preparation of a conductive paste using the obtained polyvinyl acetal resin was attempted as in Example 1. However, the resin was not dissolved in dihydroterpineol, so that no conductive paste was obtained.

(Evaluation)

Polyvinyl acetal resins or conductive pastes obtained in Examples 1 to 22 and Comparative Examples 1 to 7 were evaluated as follows. The results are shown in Table 1 and Table 2.

(1) Evaluation of Polyvinyl Acetal Resin (1-1) Acetal Group Content, Hydroxy Group content, and Acetyl Group content The obtained polyvinyl acetal resin was dissolved in $DMSO-D_6$ at a concentration of 10% by weight. The solution was subjected to $^{13}C$-NMR to measure the acetal group content, hydroxy group content, and acetyl group content.

(1-2) Number Average Molecular Weight (Mn), Weight Average Molecular Weight (Kw), and Mw/Hn The obtained polyvinyl acetal resin was dissolved in tetrahydrofuran at a concentration of 0.05% by weight and subjected to measurement using a GPC device HLC-8220 (produced by Tosoh Corporation). From the measurement results, the number average molecular weight Mn, the weight average molecular weight Mw, and the Mw/Mn were calculated using a molecular weight calibration curve obtained from monodispersed polystyrene standards. The column used was the Shedex LF-804 column (produced by Showa Denko K.K.).

(1-3) IR Absorption Spectrum

The obtained polyvinyl acetal resin was dissolved in a 1:1 weight ratio mixture solution of ethanol and toluene. The solution was then applied to a PET film. The thickness of the measurement sample was adjusted such that the peak appearing near 2,980 $cm^{-1}$ derived from the stretching vibrations of the C—H bond would have a minimum transmittance of 22%. A polyvinyl acetal resin sheet was thus obtained. An IR absorption spectrum was measured for the obtained polyvinyl acetal resin sheet at 20° C. using an infrared spectrophotometer (produced by HORIBA, FT-720). In the measurement results, a baseline was drawn for the peak appearing within the waver-umber range of 3,100 to 3,700 $cm^{-1}$ and correction was performed to adjust the transmittance of both ends of the peak to 100%. The corrected data was subjected to peak analysis to measure the minimum transmittance X, the transmittance a, and the wavenumbers A and B of the peak.

(1-4) Number and Percentage (% By Volume) of Particles Having a Diameter of 0.5 to 1.0 μm The obtained polyvinyl acetal resin was dissolved to 0.2% by weight in dihydroterpinyl acetate. The particle size distribution of the obtained solution (10 ml) was measured using a particle counter (produced by Rion Co., Ltd., KS-42C) to measure the number of particles having a diameter of 0.5 to 1.0 μm per 10 ml. The volume of the particles having a diameter of 0.5 to 1.0 μm was calculated assuming that they were true spheres having a diameter of 0.75 μm. Based on the obtained measurement results, the percentage (% by volume) of the particles having a diameter of 0.5 to 1.0 μm was calculated.

(2) Evaluation of Conductive Paste (2-1) Paste Filterability

The obtained conductive paste (2 ml) was put in a 2.5-ml syringe. To the end of the syringe was attached an injection needle having an outer diameter of 0.81 mm, an inner diameter of 0.51 mm, and a length of 33 mm. A force of 5 kgf was applied, and the time needed to eject ail the paste from the tip of the injection needle was measured.

(2-2) Printability

The conductive paste was printed in an environment at a temperature of 23° C. and a humidity of 50% using a screen printing machine, a screen printing plate, and a printing glass substrate. The solvent was dried in a fan oven at 100° C. for 30 minutes. The screen printing machine, the screen printing plate, and the printing glass substrate used were as follows.

Screen printing machine (MT-320TV, produced by Microtec Co., Ltd.)

Screen printing plate (produced by Tokyo Process Service Co., Ltd., 3T500, emulsion 2 μm, 2012 pattern, screen frame 320 mm×320 mm)

Printing glass substrate (soda glass, 150 mm×150 mm, thickness 1.5 mm)

The printed pattern was observed visually or using a magnifying microscope to examine the shape of the edges of the print surface. Printability was evaluated in accordance with the following criteria.

○ (Good): The paste was printed according to the printing pattern, and no string-like disturbance was observed at any portion of the edges of the print.

Δ (Fair): The paste was printed according to the printing pattern, and string-like disturbances were observed in one portion of the edges of the print.

x (Poor): The paste was not printed according to the printing pattern (e.g., blurred or faint printing), or string-like disturbances were observed in two or more portions of the edges of the print.

(2-3) Surface Roughness

The printed pattern of the conductive paste obtained in "(2-2) Printability" was used to measure the surface roughness at 10 sites using a surface roughness meter (SURF-COM, produced by Tokyo Seimitsu Co., Ltd.). The surface roughness was evaluated in accordance with the following criteria.

○ (Good) The average surface roughness Ra of the 10 sites was smaller than 0.100 μm.

Δ (Fair): The average surface roughness Ra of the 10 sites was 0.100 μm or greater and smaller than 0.150 μm.

x (Poor) The average surface roughness Ra of the 10 sites was 0.150 μm or greater.

TABLE 1

| | | Polyvinyl acetal resin | | | | | | | |
|---|---|---|---|---|---|---|---|---|---|
| | | Average degree of polymerization | Acetocetal group content (mol %) | Butyral group content (mol %) | Acetyl group content (mol %) | Hydroxy group content (mol %) | Ethylene content (mol %) | Carboxy group-containing constitutional unit | | Acetoacetal group content/ butyral group content |
| | | | | | | | | Structure | Amount (mol %) | |
| Example | 1 | 1750 | 27.0 | 39.0 | 12.0 | 22.0 | 0 | — | 0 | 0.69 |
| | 2 | 1750 | 27.0 | 38.2 | 10.0 | 24.0 | 0 | (7-1) | 0.8 | 0.71 |
| | 3 | 1750 | 20.0 | 54.0 | 1.0 | 25.0 | 0 | — | 0 | 0.37 |
| | 4 | 1750 | 0 | 74.0 | 4.0 | 22.0 | 0 | — | 0 | 0 |
| | 5 | 1750 | 0 | 75.9 | 2.0 | 22.0 | 0 | (7-1) | 0.1 | 0 |
| | 6 | 1750 | 0 | 80.0 | 2.0 | 18.0 | 0 | — | 0 | 0 |
| | 7 | 900 | 0 | 73.0 | 4.0 | 23.0 | 0 | — | 0 | 0 |
| | 8 | 900 | 10.0 | 58.0 | 10.0 | 22.0 | 0 | — | 0 | 0.17 |
| | 9 | 600 | 25.0 | 53.0 | 2.0 | 20.0 | 0 | — | 0 | 0.47 |
| | 10 | 600 | 0 | 78.0 | 1.0 | 21.0 | 0 | — | 0 | 0 |
| | 11 | 600 | 15.0 | 56.0 | 4.0 | 25.0 | 0 | — | 0 | 0.27 |
| | 12 | 400 | 20.0 | 56.0 | 2.0 | 22.0 | 0 | — | 0 | 0.36 |
| | 13 | 400 | 27.0 | 47.0 | 4.0 | 22.0 | 0 | — | 0 | 0.57 |
| | 14 | 250 | 27.0 | 36.0 | 12.0 | 25.0 | 0 | — | 0 | 0.75 |
| | 15 | 250 | 10.0 | 55.0 | 12.0 | 22.0 | 0 | (7-2) | 1.0 | 0.18 |
| | 16 | 250 | 27.0 | 45.0 | 10.0 | 18.0 | 0 | — | 0 | 0.6 |
| | 17 | 250 | 0 | 73.99 | 1.0 | 25.0 | 0 | (7-1) | 0.01 | 0 |
| | 18 | 250 | 0 | 74.0 | 1.0 | 25.0 | 0 | — | 0 | 0 |
| | 19 | 600 | 10.0 | 63.9 | 4.0 | 22.0 | 0 | (7-1) | 0.1 | 0.16 |
| | 20 | 1750 | 0 | 70.0 | 2.0 | 23.0 | 5.0 | — | 0 | 0.00 |
| | 21 | 400 | 25.0 | 38.0 | 4.0 | 23.0 | 10.0 | — | 0 | 0.66 |
| | 22 | 500 | 5.0 | 64.95 | 4.0 | 21.0 | 5.0 | (7-1) | 0.05 | 0.08 |
| Comparative Example | 1 | 2000 | 10.0 | 60.0 | 12.0 | 18.0 | 0 | — | 0 | 0.17 |
| | 2 | 2000 | 37.0 | 37.0 | 1.0 | 25.0 | 0 | — | 0 | 1 |
| | 3 | 1750 | 37.0 | 18.0 | 15.0 | 30.0 | 0 | — | 10 | 2.06 |
| | 4 | 500 | 37.0 | 18.0 | 15.0 | 30.0 | 0 | — | 0 | 2.06 |
| | 5 | 1750 | 0 | 79.9 | 0.1 | 20.0 | 0 | — | 0 | 0 |
| | 6 | 500 | 0 | 79.9 | 0.1 | 20.0 | 0 | — | 0 | 0 |
| | 7 | 1750 | 0 | 66.7 | 0.8 | 32.5 | 0 | — | 0 | 0 |

| | | Polyvinyl acetal resin | | | | | |
|---|---|---|---|---|---|---|---|
| | | Acetyl group content/ butyral group content | Carboxy group content/ acetyl group content | Ethylene content/ hydroxy group content | Mn | Mw | Mw/Mn |
| Example | 1 | 0.308 | 0 | 0 | 109000 | 295000 | 2.7 |
| | 2 | 0.262 | 0.08 | 0 | 110000 | 331000 | 3.0 |
| | 3 | 0.019 | 0 | 0 | 109000 | 341000 | 3.1 |
| | 4 | 0.054 | 0 | 0 | 115000 | 299000 | 2.6 |
| | 5 | 0.026 | 0.05 | 0 | 115000 | 321000 | 2.8 |
| | 6 | 0.025 | 0 | 0 | 116000 | 326000 | 2.8 |
| | 7 | 0.055 | 0 | 0 | 58900 | 159000 | 2.7 |
| | 8 | 0.172 | 0 | 0 | 58700 | 170000 | 2.9 |

TABLE 1-continued

|  |  |  |  |  |  |  |  |  |
|---|---|---|---|---|---|---|---|---|
|  |  | 9 | 0.038 | 0 | 0 | 37500 | 97000 | 2.6 |
|  |  | 10 | 0.013 | 0 | 0 | 39300 | 98400 | 2.5 |
|  |  | 11 | 0.071 | 0 | 0 | 37700 | 101800 | 2.7 |
|  |  | 12 | 0.036 | 0 | 0 | 25000 | 65100 | 2.6 |
|  |  | 13 | 0.085 | 0 | 0 | 24800 | 62000 | 2.5 |
|  |  | 14 | 0.333 | 0 | 0 | 15600 | 39000 | 2.5 |
|  |  | 15 | 0.218 | 0.083 | 0 | 16500 | 38000 | 2.3 |
|  |  | 16 | 0.222 | 0 | 0 | 16000 | 38000 | 2.4 |
|  |  | 17 | 0.014 | 0.01 | 0 | 16100 | 35000 | 2.2 |
|  |  | 18 | 0.014 | 0 | 0 | 16100 | 37000 | 2.3 |
|  |  | 19 | 0.063 | 0.025 | 0 | 38700 | 98000 | 2.5 |
|  |  | 20 | 0.029 | 0.000 | 0.2 | 115000 | 400000 | 3.5 |
|  |  | 21 | 0.105 | 0.000 | 0.4 | 25100 | 56700 | 2.3 |
|  |  | 22 | 0.062 | 0.013 | 0.2 | 31600 | 74800 | 2.4 |
| Comparative | | 1 | 0.200 | 0 | 0 | 133000 | 426000 | 3.2 |
| Example | | 2 | 0.027 | 0 | 0 | 119000 | 391000 | 3.3 |
|  |  | 3 | 0.833 | 0 | 0 | 105000 | 284000 | 2.7 |
|  |  | 4 | 0.833 | 0 | 0 | 30000 | 72000 | 2.4 |
|  |  | 5 | 0.001 | 0 | 0 | 115000 | 322000 | 2.8 |
|  |  | 6 | 0.001 | 0 | 0 | 32900 | 72200 | 2.2 |
|  |  | 7 | 0.012 | 0 | 0 | 116000 | 310000 | 2.7 |

TABLE 2

| | | | Polyvinyl acetal resin | | | | | | | |
|---|---|---|---|---|---|---|---|---|---|---|
| | | | Minimum transmittance X (%) | Trans-mittance a (%) | Wave-number A ($cm^{-1}$) | Wave-number B ($cm^{-1}$) | 3470 − A ($cm^{-1}$) | [3470 − A]/ [B − 3470] | (3470 − A) Hydroxy group content ($cm^{-1}$/mol %) | Number of particles having particle size of 0.5 to 1.0 μm | Percentage of particles having particle size of 0.5 to 1.0 μm (% by volume) |
| Example | | 1 | 74 | 87 | 3390 | 3570 | 80 | 0.80 | 3.64 | 9000 | $1.99 \times 10^{-8}$ |
| | | 2 | 71.5 | 85.75 | 3370 | 3570 | 100 | 1.00 | 4.17 | 9500 | $2.10 \times 10^{-8}$ |
| | | 3 | 70.5 | 85.25 | 3350 | 3570 | 120 | 1.20 | 4.80 | 11000 | $2.43 \times 10^{-8}$ |
| | | 4 | 75 | 87.5 | 3400 | 3570 | 70 | 0.70 | 3.18 | 9000 | $1.99 \times 10^{-8}$ |
| | | 5 | 74.5 | 87.25 | 3380 | 3560 | 90 | 1.00 | 4.09 | 9500 | $2.10 \times 10^{-8}$ |
| | | 6 | 82 | 91 | 3400 | 3560 | 70 | 0.78 | 3.89 | 9500 | $2.10 \times 10^{-8}$ |
| | | 7 | 73 | 86.5 | 3380 | 3570 | 90 | 0.90 | 3.91 | 8000 | $1.77 \times 10^{-8}$ |
| | | 8 | 75 | 87.5 | 3400 | 3560 | 70 | 0.78 | 3.18 | 8500 | $1.88 \times 10^{-8}$ |
| | | 9 | 78 | 89 | 3390 | 3570 | 80 | 0.80 | 4.00 | 8500 | $1.88 \times 10^{-8}$ |
| | | 10 | 78 | 89 | 3380 | 3560 | 90 | 1.00 | 4.29 | 8000 | $1.77 \times 10^{-8}$ |
| | | 11 | 71 | 85.5 | 3360 | 3580 | 110 | 1.00 | 4.40 | 8000 | $1.77 \times 10^{-8}$ |
| | | 12 | 74 | 87 | 3380 | 3570 | 90 | 0.90 | 4.09 | 7500 | $1.66 \times 10^{-8}$ |
| | | 13 | 73 | 86.5 | 3390 | 3570 | 80 | 0.80 | 3.64 | 7000 | $1.55 \times 10^{-8}$ |
| | | 14 | 70 | 85 | 3360 | 3580 | 110 | 1.00 | 4.40 | 6000 | $1.33 \times 10^{-8}$ |
| | | 15 | 74 | 87 | 3380 | 3570 | 90 | 0.90 | 4.09 | 6000 | $1.33 \times 10^{-8}$ |
| | | 16 | 81 | 90.5 | 3390 | 3560 | 80 | 0.89 | 4.44 | 6000 | $1.33 \times 10^{-8}$ |
| | | 17 | 70 | 85 | 3360 | 3570 | 110 | 1.10 | 4.40 | 6500 | $1.44 \times 10^{-8}$ |
| | | 18 | 71 | 85.5 | 3360 | 3570 | 110 | 1.10 | 4.40 | 6500 | $1.44 \times 10^{-8}$ |
| | | 19 | 78 | 89 | 3390 | 3570 | 80 | 0.80 | 3.64 | 7000 | $1.55 \times 10^{-8}$ |
| | | 20 | 76 | 88 | 3360 | 3570 | 110 | 1.10 | 4.78 | 10000 | $2.21 \times 10^{-8}$ |
| | | 21 | 73 | 86.5 | 3380 | 3570 | 90 | 0.90 | 3.91 | 9000 | $1.99 \times 10^{-8}$ |
| | | 22 | 76 | 88 | 3370 | 3570 | 100 | 1.00 | 4.76 | 8000 | $1.77 \times 10^{-8}$ |
| Comparative | | 1 | 80 | 90 | 3360 | 3560 | 110 | 1,22 | 6.11 | 20000 | $4.42 \times 10^{-8}$ |
| Example | | 2 | 69 | 84.5 | 3320 | 3570 | 150 | 1.50 | 6.00 | Not dissolved in solvent | — |
| | | 3 | 66 | 83 | 3310 | 3560 | 160 | 1.78 | 5.33 | Not dissolved in solvent | — |
| | | 4 | 65 | 82.5 | 3310 | 3560 | 160 | 1.78 | 5.33 | Not dissolved in solvent | — |
| | | 5 | 78 | 89 | 3360 | 3560 | 110 | 1.22 | 5.50 | 25000 | $5.53 \times 10^{-8}$ |
| | | 6 | 79 | 89.5 | 3360 | 3560 | 110 | 1.22 | 5.50 | 23000 | $5.08 \times 10^{-8}$ |
| | | 7 | 62 | 81 | 3310 | 3560 | 160 | 1.78 | 4.92 | Not dissolved in solvent | — |

| | | | Conductive paste evaluation | | | |
|---|---|---|---|---|---|---|
| | | | Paste filterability (min) | Printability | | Surface roughness (μm) | |
| Example | | 1 | 4 | 0 portion | ○ | 0.092 | ○ |
| | | 2 | 4 | 0 portion | ○ | 0.096 | ○ |
| | | 3 | 4 | 0 portion | ○ | 0.095 | ○ |
| | | 4 | 3.5 | 0 portion | ○ | 0.087 | ○ |
| | | 5 | 3.5 | 0 portion | ○ | 0.089 | ○ |
| | | 6 | 3.5 | 0 portion | ○ | 0.091 | ○ |
| | | 7 | 2 | 0 portion | ○ | 0.084 | ○ |
| | | 8 | 2.5 | 0 portion | ○ | 0.088 | ○ |
| | | 9 | 2 | 0 portion | ○ | 0.082 | ○ |
| | | 10 | 1.5 | 0 portion | ○ | 0.079 | ○ |

TABLE 2-continued

| | | | | | | | | Polyvinyl acetal resin | | |
|---|---|---|---|---|---|---|---|---|---|---|
| | Minimum transmittance X (%) | Trans- mittance a (%) | Wave- number A (cm⁻¹) | Wave- number B (cm⁻¹) | 3470 − A (cm⁻¹) | [3470 − A]/ [B − 3470] | (3470 − A)/ Hydroxy group content (cm⁻¹/mol %) | Number of particles having particle size of 0.5 to 1.0 μm | Percentage of particles having particle size of 0.5 to 1.0 μm (% by volume) |
| | | 11 | 2 | | 0 portion | | ○ | 0.078 | ○ |
| | | 12 | 1.5 | | 0 portion | | ○ | 0.075 | ○ |
| | | 13 | 1.5 | | 0 portion | | ○ | 0.071 | ○ |
| | | 14 | 1.5 | | 0 portion | | ○ | 0.069 | ○ |
| | | 15 | 1.5 | | 0 portion | | ○ | 0.072 | ○ |
| | | 16 | 1 | | 0 portion | | ○ | 0.065 | ○ |
| | | 17 | 1 | | 0 portion | | ○ | 0.062 | ○ |
| | | 18 | 1 | | 0 portion | | ○ | 0.063 | ○ |
| | | 19 | 1.5 | | 0 portion | | ○ | 0.070 | ○ |
| | | 20 | 3.5 | | 0 portion | | ○ | 0.090 | ○ |
| | | 21 | 1.5 | | 0 portion | | ○ | 0.074 | ○ |
| | | 22 | 1.5 | | 0 portion | | ○ | 0.068 | ○ |
| Comparative Example | | 1 | 6 | | 3 portions | | x | 0.325 | x |
| | | 2 | — | | — | | — | — | — |
| | | 3 | — | | — | | — | — | — |
| | | 4 | — | | — | | — | — | — |
| | | 5 | 8 | | 2 portions | | x | 0.257 | x |
| | | 6 | 5.5 | | 1 portion | | Δ | 0.11 | Δ |
| | | 7 | — | | — | | — | — | — |

INDUSTRIAL APPLICABILITY

The present invention can provide a conductive paste which leaves less fine undissolved matter when dissolved in an organic solvent and thus can be easily filtrated, which has excellent printability, and which can exhibit excellent surface smoothness after printing.

The invention claimed is:

1. A conductive paste used for forming an electrode of a multilayer ceramic capacitor, the conductive paste comprising:
    a polyvinyl acetal resin;
    an organic solvent; and
    a conductive powder,
    the polyvinyl acetal resin having:
    a wavenumber A (cm⁻¹) of a peak within a range of 3,100 cm⁻¹ or higher and lower than 3,470 cm⁻¹ in an IR absorption spectrum measured using an infrared spectrophotometer; and
    a hydroxy group content (mol %),
    the wavenumber A of the peak and the hydroxy group content satisfying relations of the following formulas (1) and (2):

$$[(3{,}470{-}A)/\text{Hydroxy group content}] \leq 5.0 \quad (1)$$

$$(3{,}470{-}A) \leq 150 \quad (2)$$

wherein A is a wavenumber which is lower than 3,470 cm⁻¹ and at which a transmittance a (%) satisfying [100−(100−X)/2] is exhibited, where X (%) is a minimum transmittance of the peak within the wavenumber range of 3,100 to 3,700 cm⁻¹.

2. The conductive paste according to claim 1,
    wherein the polyvinyl acetal resin has a wavenumber B (cm⁻¹) of the peak within the wavenumber of higher than 3,470 cm⁻¹ and 3,700 cm⁻¹ or lower in the IR absorption spectrum measured using the infrared spectrophotometer; and
    the wavenumber A of the peak and the wavenumber B of the peak satisfy a relation of the following formula (3):

$$(3{,}470{-}A)/(B{-}3{,}470) \leq 1.4 \quad (3)$$

wherein B is a wavenumber which is higher than 3,470 cm⁻¹ and at which the transmittance a (%) satisfying [100−(100−X)/2] is exhibited, where X (%) is the minimum transmittance of the peak within the wavenumber range of 3,100 to 3,700 cm⁻¹.

3. The conductive paste according claim 2,
    wherein the polyvinyl acetal resin has a hydroxy group content of 16 to 25 mol %, an acetyl group content of 0.1 to 12 mol %, and an acetoacetal group content of 27 mol % or less.

4. The conductive paste according to claim 3,
    wherein the polyvinyl acetal resin contains a carboxy group-containing constitutional unit in an amount of 0.01 to 1.0 mol %.

5. The conductive paste according to claim 2,
    wherein the polyvinyl acetal resin contains a carboxy group-containing constitutional unit in an amount of 0.01 to 1.0 mol %.

6. The conductive paste according claim 1,
    wherein the polyvinyl acetal resin has a hydroxy group content of 16 to 25 mol %, an acetyl group content of 0.1 to 12 mol %, and an acetoacetal group content of 27 mol % or less.

7. The conductive paste according to claim 6,
    wherein the polyvinyl acetal resin contains a carboxy group-containing constitutional unit in an amount of 0.01 to 1.0 mol %.

8. The conductive paste according to claim 1,
    wherein the polyvinyl acetal resin contains a carboxy group-containing constitutional unit in an amount of 0.01 to 1.0 mol %.

* * * * *